US011874505B2

(12) United States Patent
Hu et al.

(10) Patent No.: US 11,874,505 B2
(45) Date of Patent: Jan. 16, 2024

(54) FIBER OPTIC CONNECTORS AND ASSOCIATED ADAPTERS

(71) Applicant: Senko Advanced Components, Inc., Marlborough, MA (US)

(72) Inventors: Guanpeng Hu, Shanghai (CN); Yim Wong, Kowloon (HK); Kazuyoshi Takano, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/181,653

(22) Filed: Feb. 22, 2021

(65) Prior Publication Data

US 2021/0263226 A1 Aug. 26, 2021

Related U.S. Application Data

(60) Provisional application No. 63/056,508, filed on Jul. 24, 2020, provisional application No. 62/979,867, filed on Feb. 21, 2020.

(51) Int. Cl.
*G02B 6/38* (2006.01)

(52) U.S. Cl.
CPC ......... *G02B 6/3825* (2013.01); *G02B 6/3849* (2013.01); *G02B 6/3874* (2013.01); *G02B 6/3891* (2013.01)

(58) Field of Classification Search
CPC ........................................................ G02B 6/38
USPC ............................................................ 385/53
See application file for complete search history.

(56) References Cited

U.S. PATENT DOCUMENTS

| | | | | |
|---|---|---|---|---|
| 9,726,831 | B2 * | 8/2017 | Gniadek | G02B 6/3821 |
| 9,897,766 | B2 * | 2/2018 | Gniadek | G02B 6/3821 |
| 10,545,295 | B1 * | 1/2020 | Sato | G02B 6/3825 |
| 10,973,400 | B2 * | 4/2021 | Yajima | A61B 1/00006 |
| 11,175,466 | B2 * | 11/2021 | Gniadek | G02B 6/3821 |
| 11,262,520 | B2 * | 3/2022 | Geens | G02B 6/4471 |

(Continued)

FOREIGN PATENT DOCUMENTS

| | | | | |
|---|---|---|---|---|
| AU | 2012384281 B2 * | 3/2015 | | G02B 6/3821 |
| CN | 101939680 A * | 1/2011 | | G02B 6/3816 |

(Continued)

OTHER PUBLICATIONS

International Search Report and Written Opinion for PCT App. No. PCT/US21/19047, dated May 24, 2021, 68 pages.

*Primary Examiner* — Kaveh C Kianni

(57) ABSTRACT

A fiber optic connector having a ferrule that forms an optical connection with another fiber optic connector. An outer housing supports the ferrule and has a front end portion and a longitudinal centerline axis. The front end portion includes a front end face with a portion of the ferrule being forward of the front end face. The front end portion includes a protector that is shaped and arranged to protect the ferrule. The protector is arranged so that the fiber optic connector and another fiber optic connector of identical construction can, starting in the same orientation, be mated together by rotating said other fiber optic connector 180° about an axis perpendicular to the longitudinal centerline axis, aligning the longitudinal centerline axes and moving the fiber optic connectors along the longitudinal centerline axes until the fiber optic connectors are mated to form the optical connection.

20 Claims, 29 Drawing Sheets

22A 14 28 30 10 C 12 22B

(56) References Cited

U.S. PATENT DOCUMENTS

| | | | | |
|---|---|---|---|---|
| 2007/0297723 | A1 | 12/2007 | Flower et al. | |
| 2014/0241688 | A1 * | 8/2014 | Isenhour .............. | G02B 6/3825 29/428 |
| 2017/0139158 | A1 * | 5/2017 | Coenegracht ........ | G02B 6/3891 |
| 2019/0137694 | A1 | 5/2019 | Murray et al. | |
| 2019/0235182 | A1 * | 8/2019 | Cheng .................. | G02B 6/3882 |
| 2019/0265418 | A1 * | 8/2019 | Gniadek .............. | G02B 6/3821 |
| 2019/0302374 | A1 | 10/2019 | Lee et al. | |
| 2022/0221658 | A1 * | 7/2022 | Lu ........................ | G02B 6/3849 |

FOREIGN PATENT DOCUMENTS

| | | | | | |
|---|---|---|---|---|---|
| CN | 106886074 | A | | 6/2017 | |
| CN | 105339822 | B | * | 10/2017 | ........... G02B 6/3825 |
| CN | 111919152 | A | * | 11/2020 | ........... G02B 6/3825 |
| JP | 2014202891 | A | * | 10/2014 | |
| TW | 202032863 | A | * | 9/2020 | ................ B41J 2/17 |
| WO | WO-2019157660 | A1 | * | 8/2019 | |

* cited by examiner

FIBER OPTIC CONNECTORS AND ASSOCIATED ADAPTERS

CROSS-REFERENCE TO RELATED APPLICATIONS

This application claims priority to U.S. Provisional App. No. 62/979,867, filed Feb. 21, 2020, and U.S. Provisional App. No. 63/056,508, filed Jul. 24, 2020, the entireties of which are hereby incorporated by reference.

FIELD

The present disclosure generally relates to fiber optic connections, and, more specifically, to a fiber optic connectors and associated adapters.

BACKGROUND

Optical connectors are used within optical communication networks to interconnect optical cables to optical devices or other optical cables. Optical connections typically involve two optical connectors connected together (with or without the assistance of an adapter).

SUMMARY

In one aspect, a fiber optic connector comprises a ferrule configured to form an optical connection with another fiber optic connector. An outer housing supports the ferrule. The outer housing has a rear end portion, a front end portion and a longitudinal centerline axis extending between the rear end portion and the front end portion. The front end portion includes a front end face. At least a portion of the ferrule is forward of the front end face. The front end portion includes one or more protectors projecting forward of the front end face of the outer housing. The one or more protectors are shaped and arranged to protect the portion of the ferrule that is forward of the front end face of the outer housing. The one or more protectors are configured so that the fiber optic connector and another fiber optic connector of identical construction can, starting in the same orientation, be mated together to form the optical connection by rotating said other fiber optic connector 180° about an axis perpendicular to the longitudinal centerline axis, aligning the longitudinal centerline axes of the fiber optic connectors and moving the fiber optic connectors along the longitudinal centerline axes until the fiber optic connectors are mated to form the optical connection.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
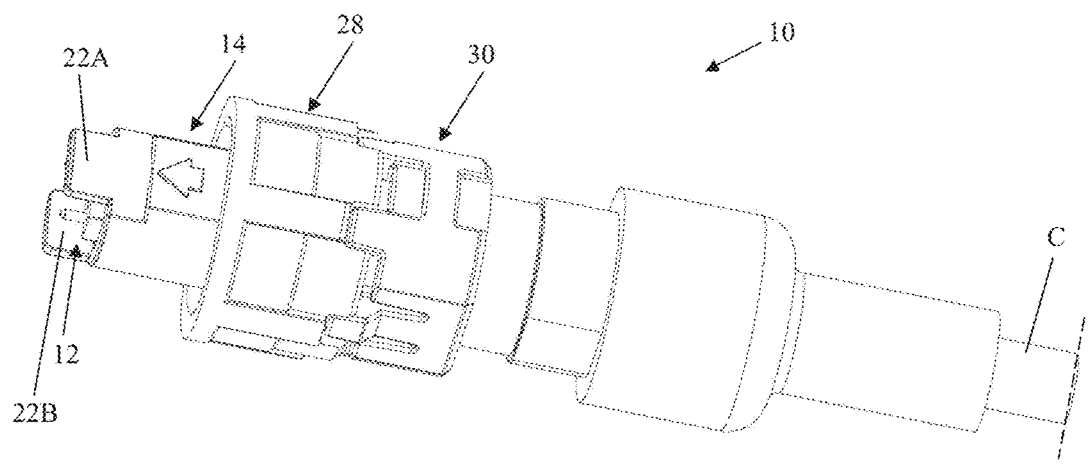
FIG. 1 is a side perspective of a fiber optic connector according to one embodiment of the present disclosure.
Figure 2:
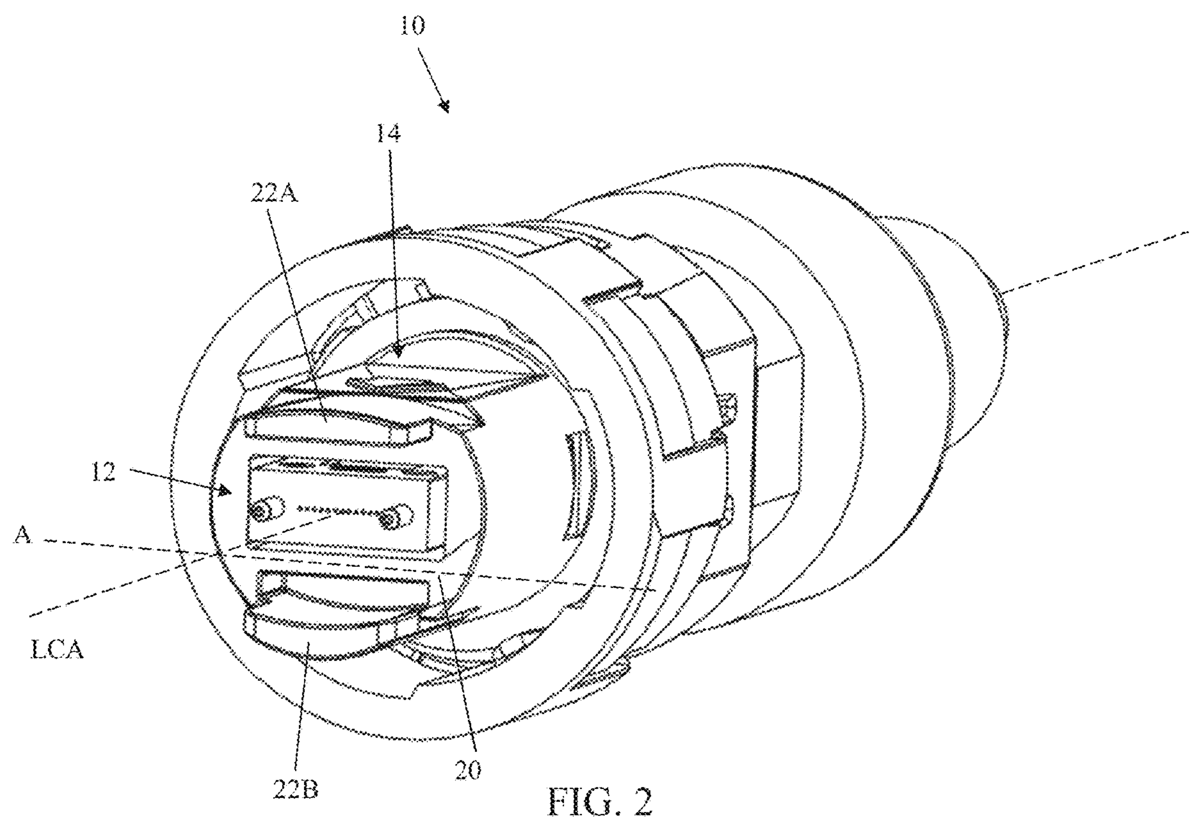
FIG. 2 is a front perspective thereof.
Figure 3:
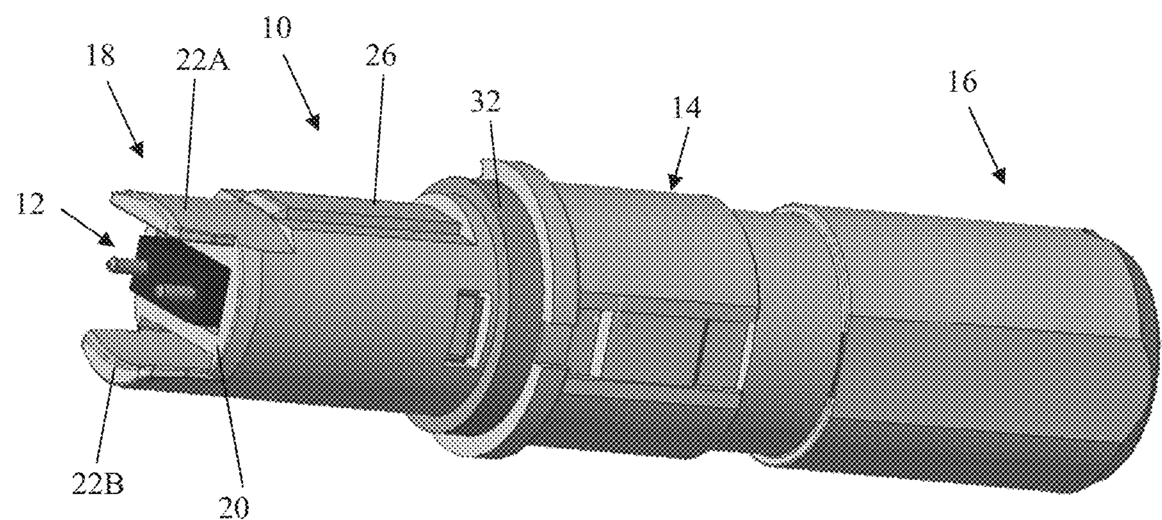
FIG. 3 is a side perspective thereof, with a coupling element of the fiber optic connector hidden from view to reveal interior details.
Figure 4:
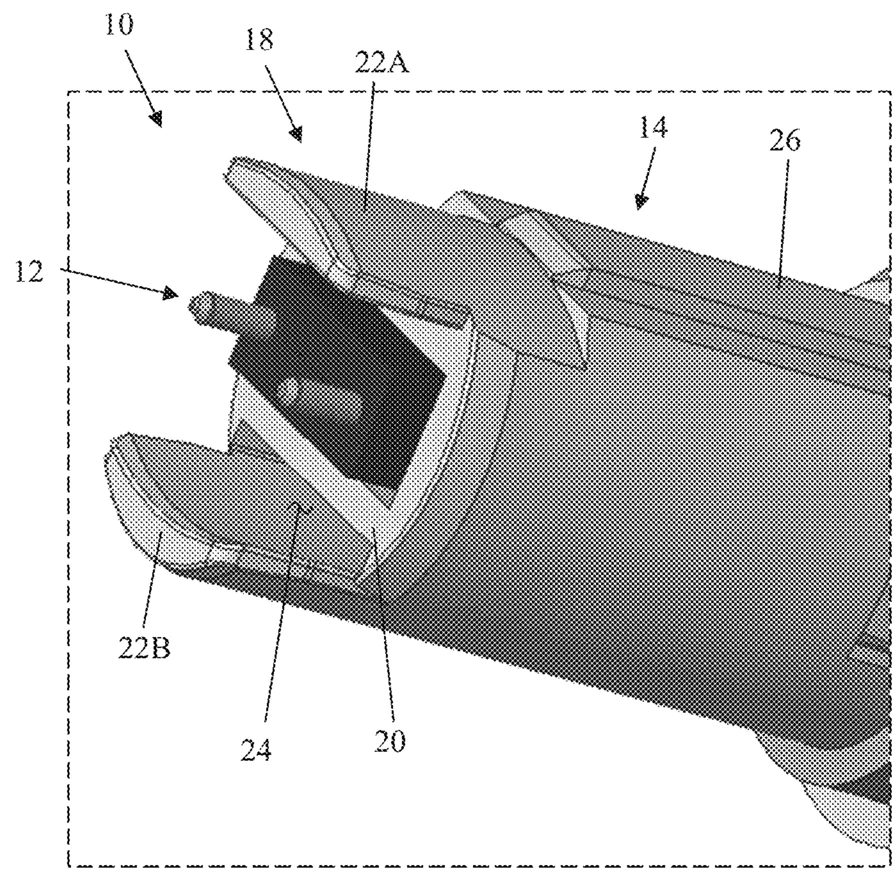
FIG. 4 is an enlarged fragment of the fiber optic connector as shown in FIG. 3.
Figure 5:
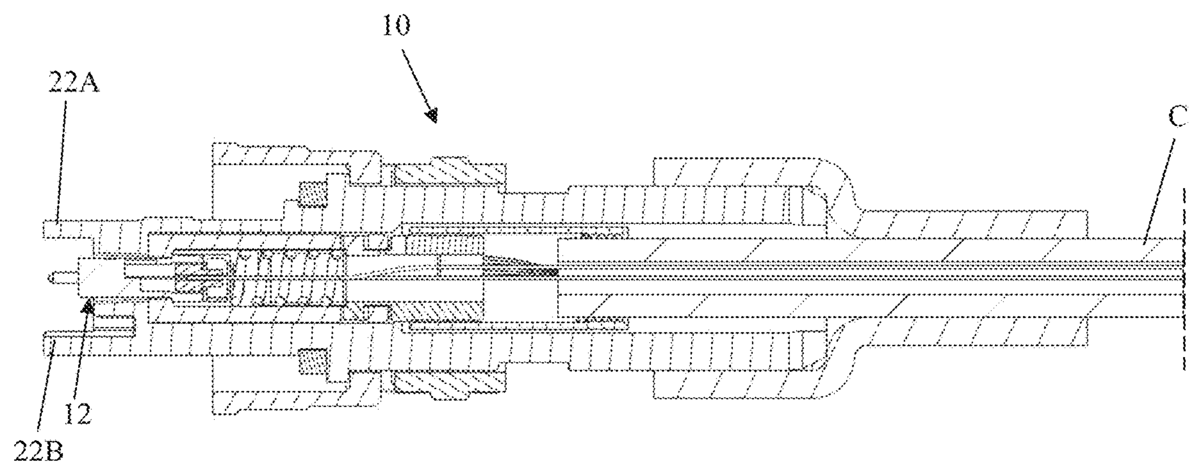
FIG. 5 is vertical section of the fiber optic connector of FIG. 1.

Referring to FIGS. 1-6, a fiber optic connector according to one embodiment of the present disclosure is generally indicated at reference numeral 10. The fiber optic connector is constructed to form a fiber optic connection with a fiber optic device, such an another fiber optic connector. When coupled to the fiber optic device, the fiber optic connector 10 and fiber optic device form an optical connection that enables communication between different fiber optic components (e.g., cables, devices, etc.) in an optical communications network. The fiber optic connector 10 is attached to an end of a fiber optic cable C, although other arrangements are within the scope of the present disclosure. Other configurations of the fiber optic connector 10 are within the scope of the present disclosure. For example, the connector could make electrical or other types of connections instead of or in addition to an optical connection.

Figure 14:
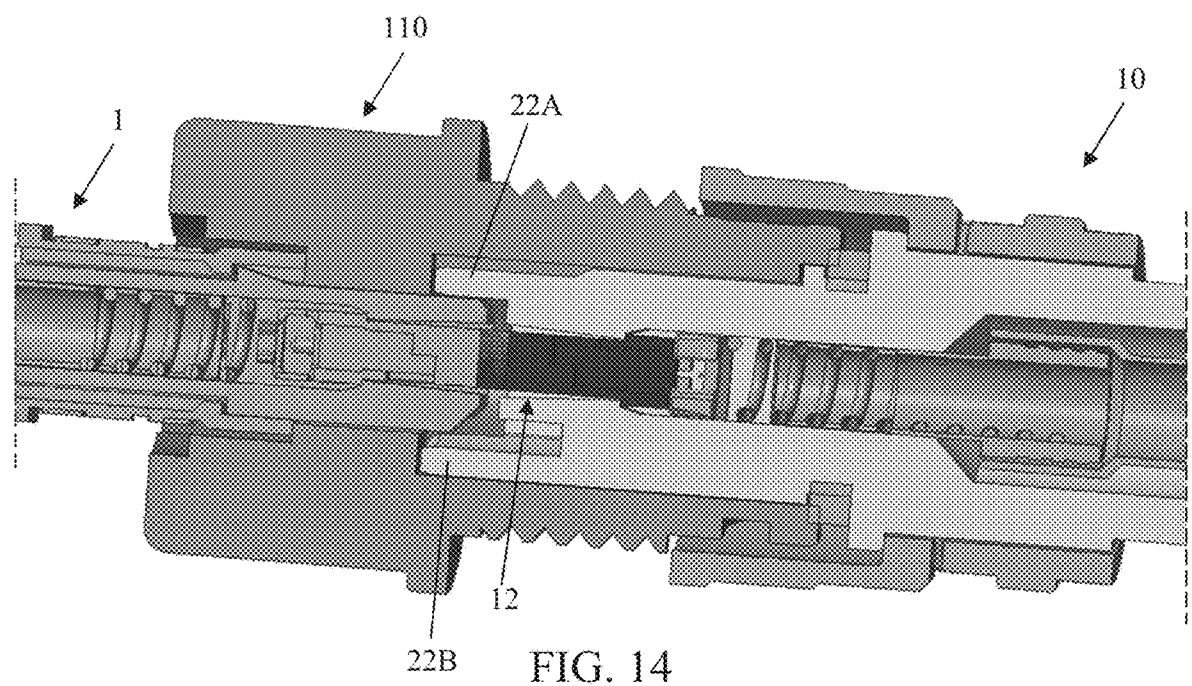
FIG. 14 is a vertical section perspective of the adapter of FIG. 7 coupled to the fiber optic connector of FIG. 1 and the conventional fiber optic connector.
Figure 15:
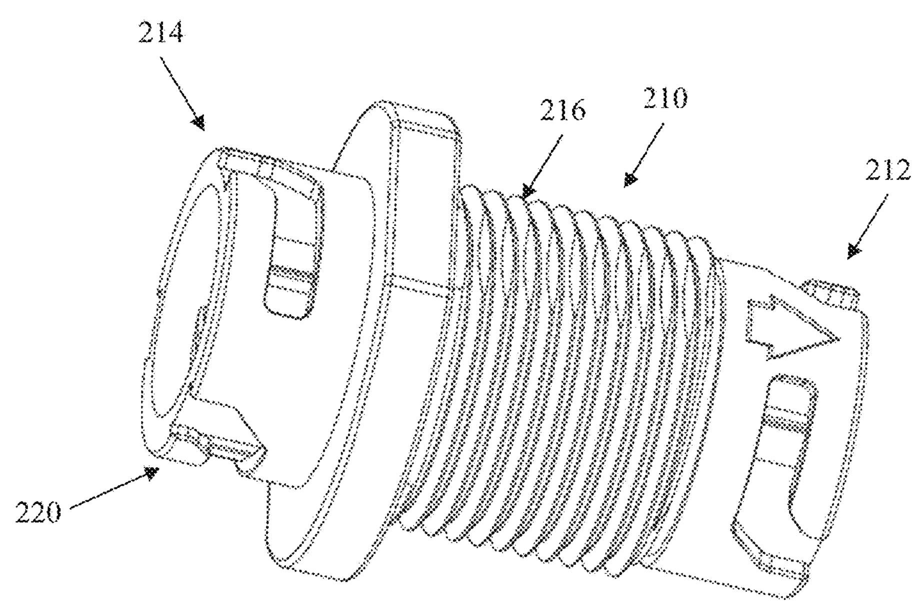
FIG. 15 is a side perspective of an adapter according to another embodiment of the present disclosure for coupling two fiber optic connectors of FIG. 1.
Figure 16:
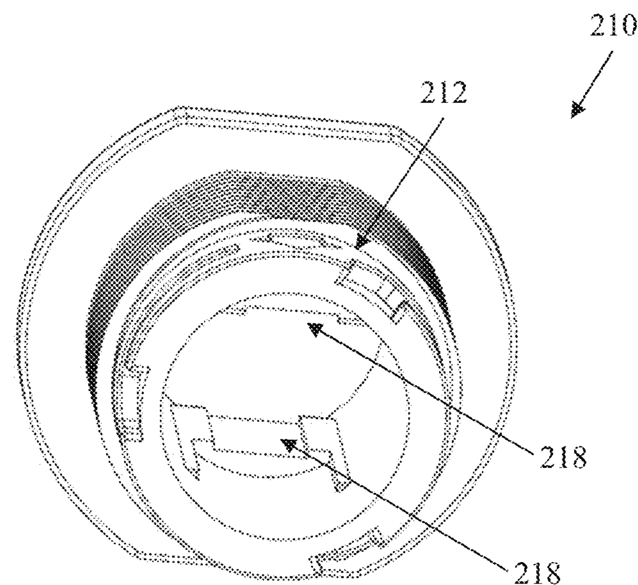
FIG. 16 is a rear perspective thereof.
Figure 17:
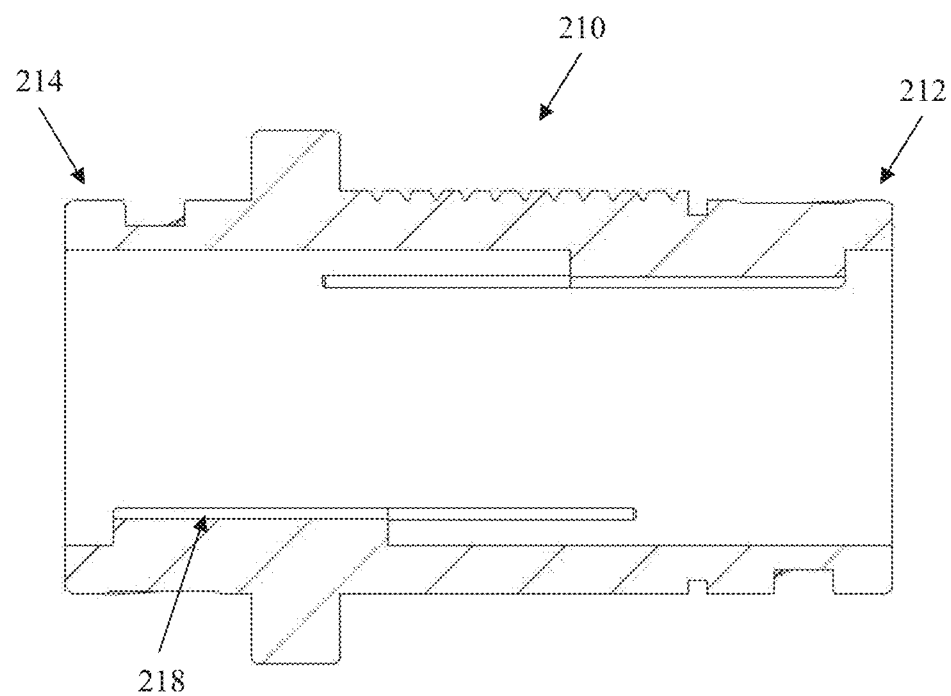
FIG. 17 is a vertical section thereof.
Figure 18:
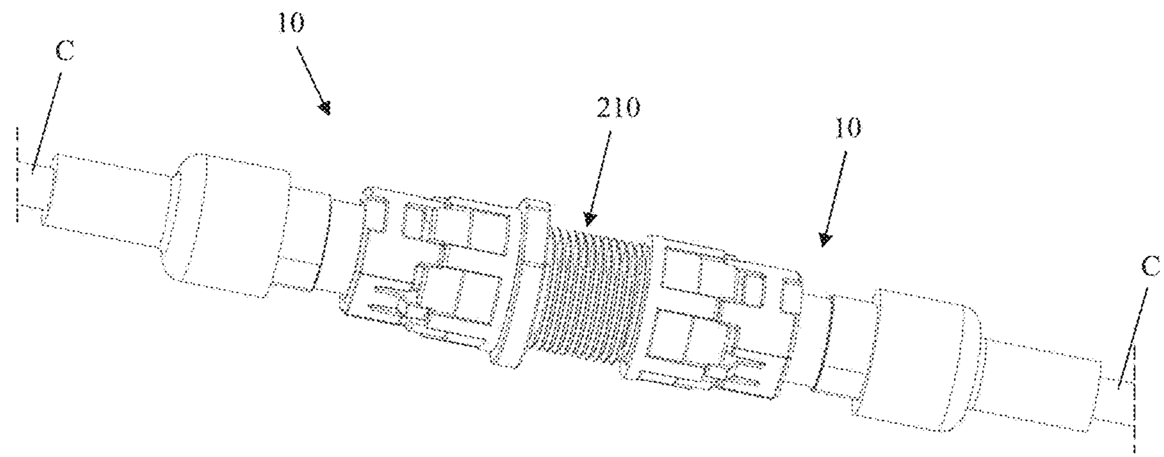
FIG. 18 a perspective of two fiber optic connectors of FIG. 1 attached to the adapter of FIG. 15.
Figure 19:
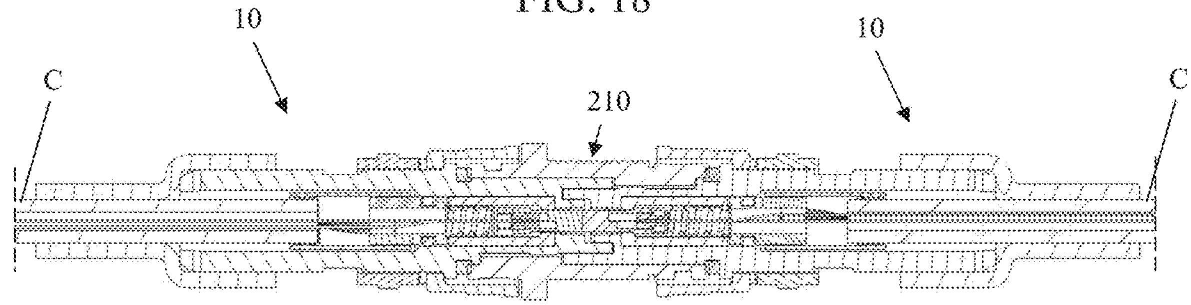
FIG. 19 is a vertical section thereof.
Figure 20:
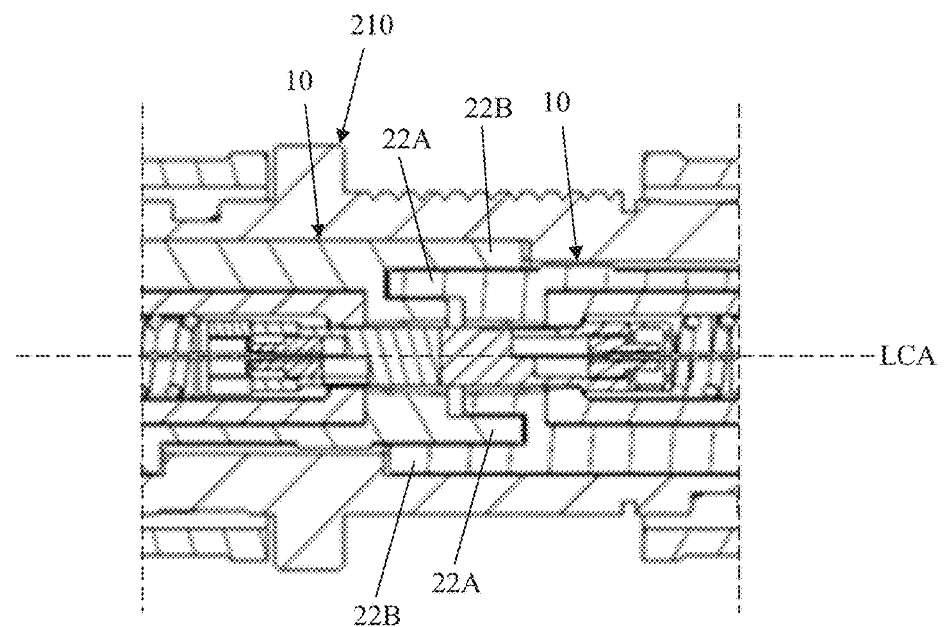
FIG. 20 is an enlarged fragment of FIG. 19.
Figure 21:
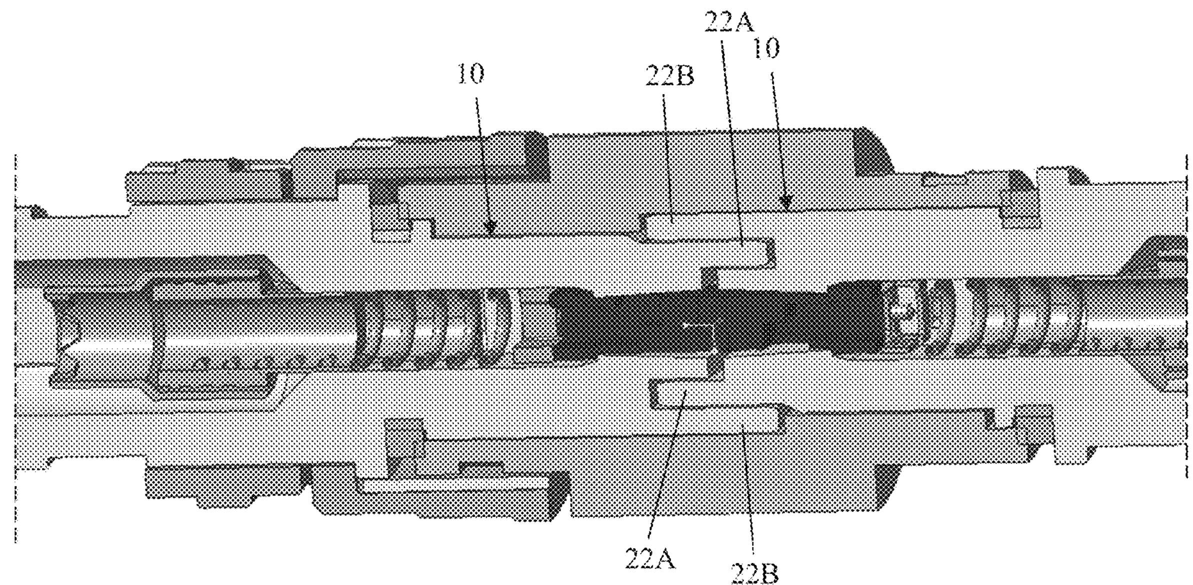
FIG. 21 is a vertical section perspective of the two fiber optic connectors of FIG. 1 couple to an adapter similar to the adapter of FIG. 15.
Figure 22:
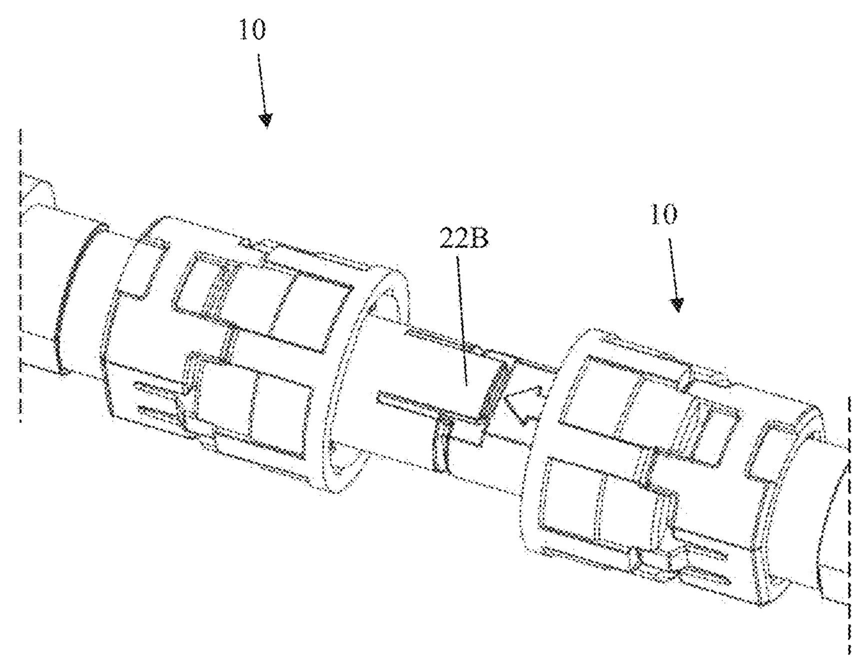
FIG. 22 is similar to FIG. 18, with the adapter hidden from view to reveal interior details.
Figure 23:
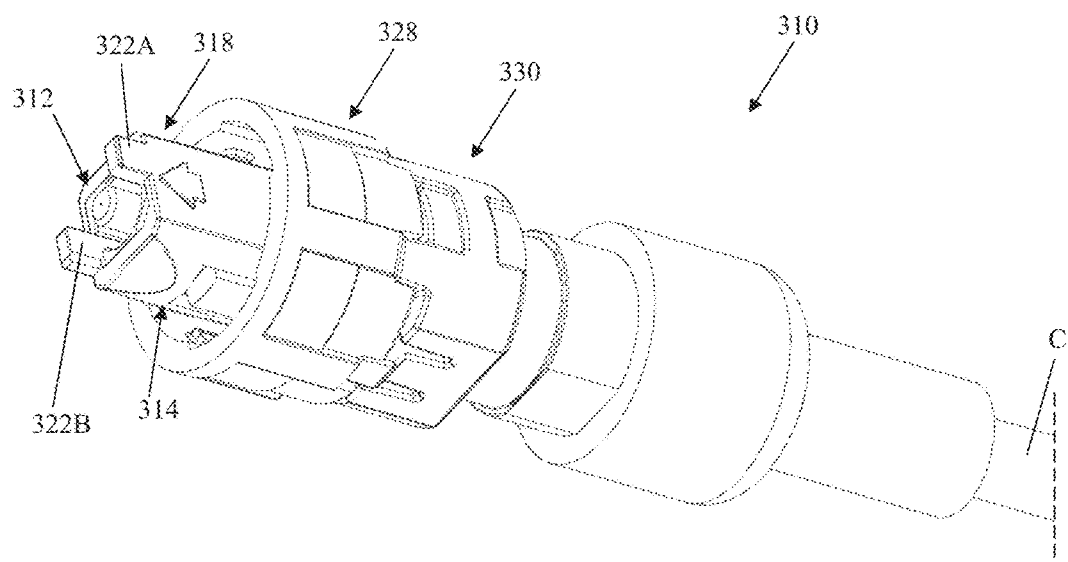
FIG. 23 is a side perspective of a fiber optic connector according to another embodiment of the present disclosure.
Figure 24:
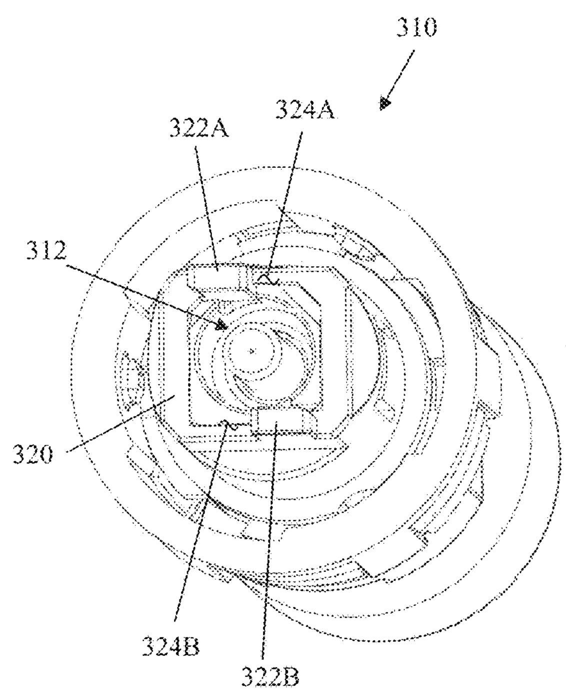
FIG. 24 is a front perspective thereof from a vantage below the connector.
Figure 25:
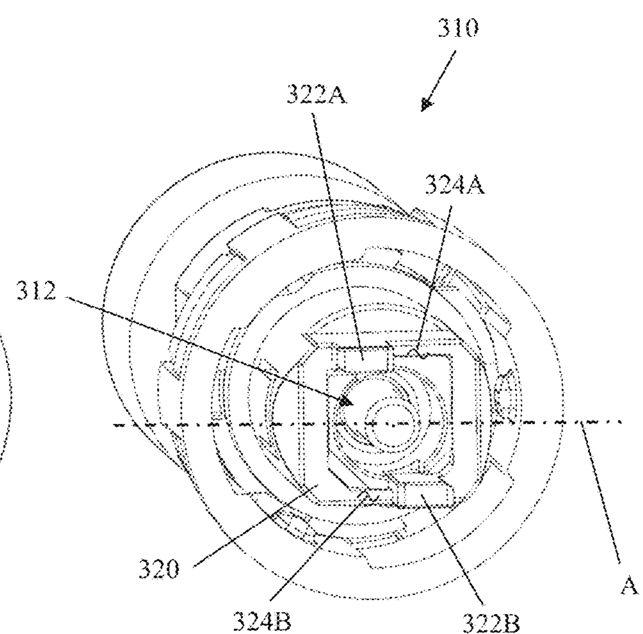
FIG. 25 is a front perspective thereof from a vantage to the left of the connector.
Figure 26:
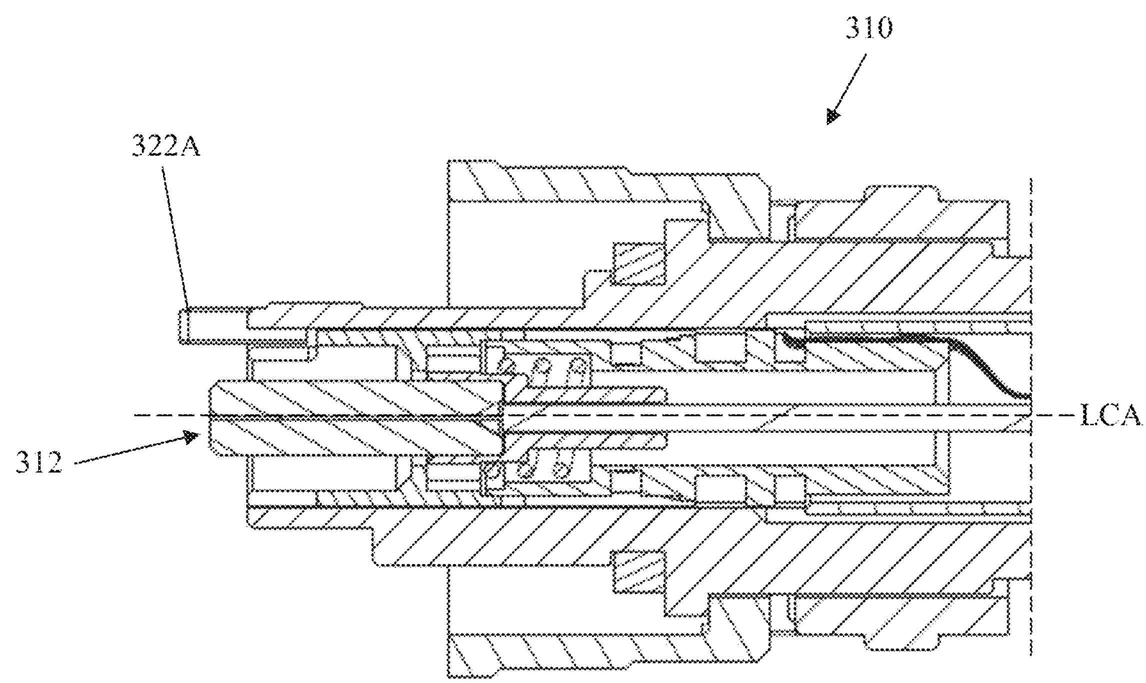
FIG. 26 is an enlarged, fragmentary vertical section thereof.
Figure 27:
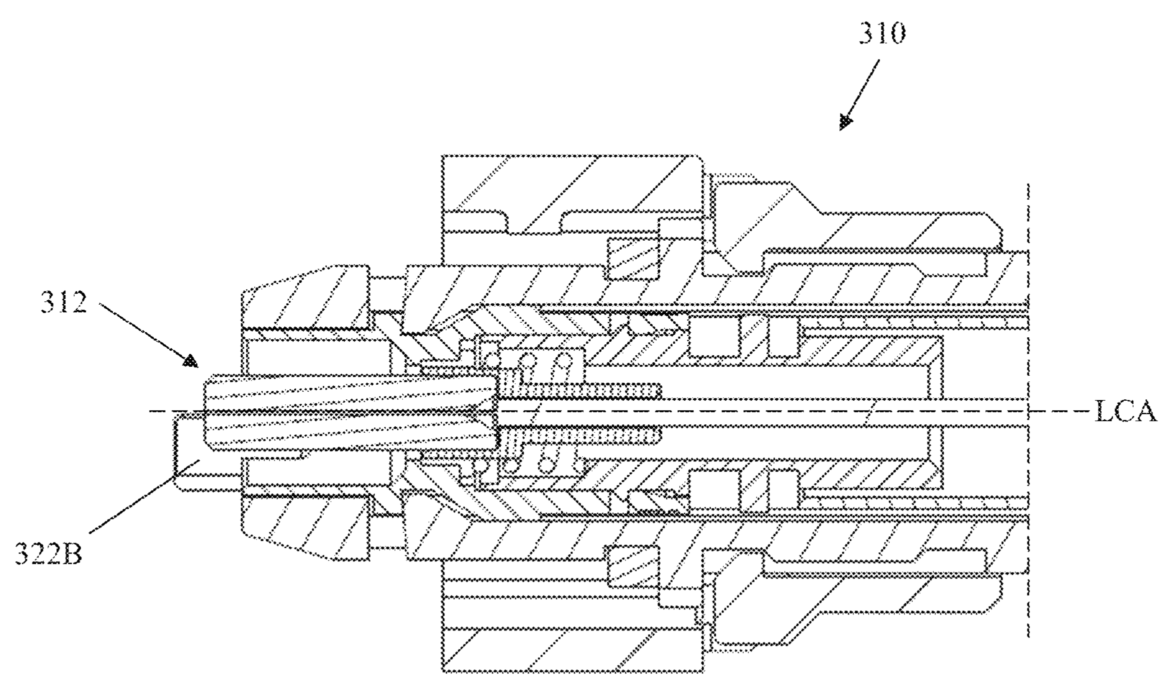
FIG. 27 is an enlarged, fragmentary horizontal section thereof.
Figure 28:
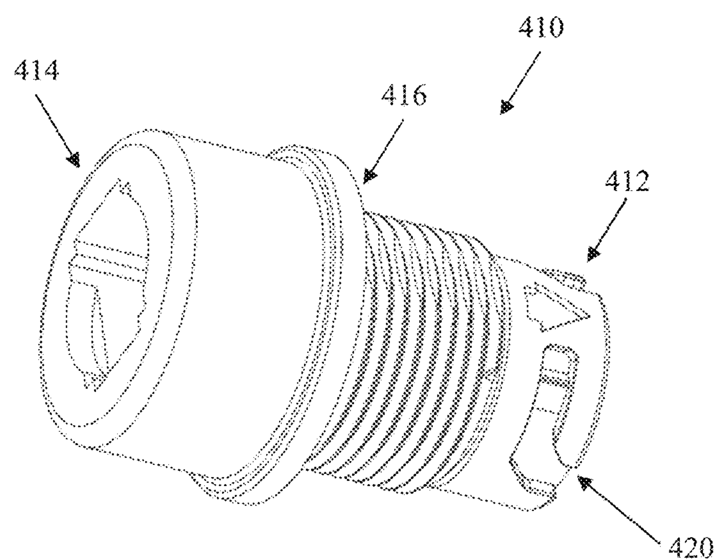
FIG. 28 is a side perspective of an adapter according to another embodiment of the present disclosure for coupling to the fiber optic connector of FIG. 23 and a conventional fiber optic connector.
Figure 29:
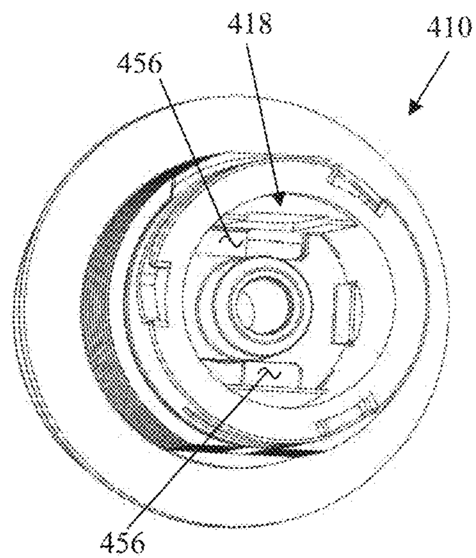
FIG. 29 is a rear perspective thereof.
Figure 30:
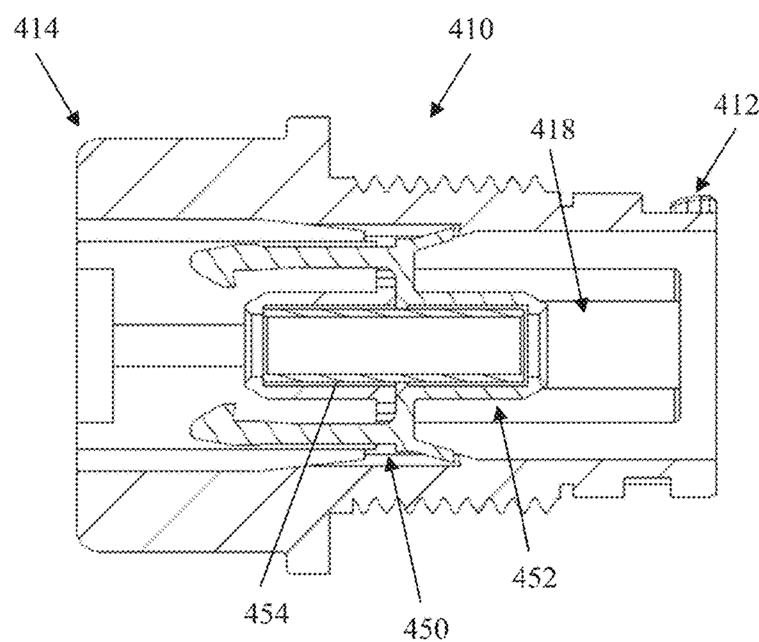
FIG. 30 is a horizontal section thereof.
Figure 31:
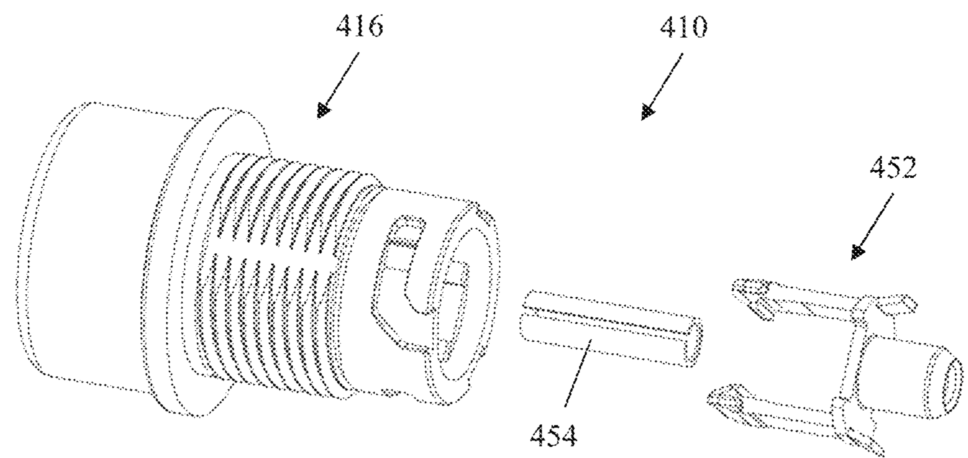
FIG. 31 is an exploded perspective thereof.
Figure 32:
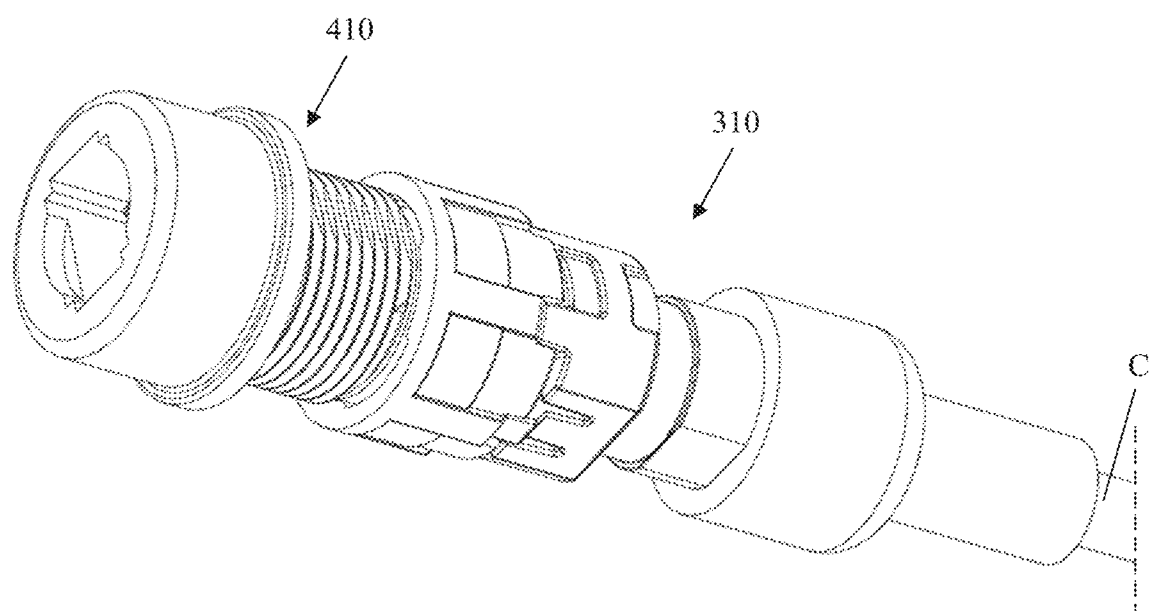
FIG. 32 is a perspective of the fiber optic connector of FIG. 23 attached to the adapter of FIG. 28.

The fiber optic connector 10 includes a ferrule 12 (broadly, at least one ferrule) configured to form an optical connection with another fiber optic device, such as a conventional fiber optic connector 1 (FIG. 14) or an identical fiber optic connector (FIGS. 19-21). In the illustrated embodiment, the ferrule 12 is a multi-fiber push-on (MPO) ferrule, although other types of ferrules are within the scope of the present disclosure. The fiber optic connector 10 includes an outer housing 14 supporting the ferrule 12. The outer housing 14 includes a proximal (rear) end portion 16 and a distal (front) end portion 18. A longitudinal centerline axis LCA extends between the rear end portion 16 and the front end portion 18. The front end portion 18 includes a front end face 20. As illustrated, at least a portion of the ferrule 12 is forward of the front end face 20.

Figure 64:
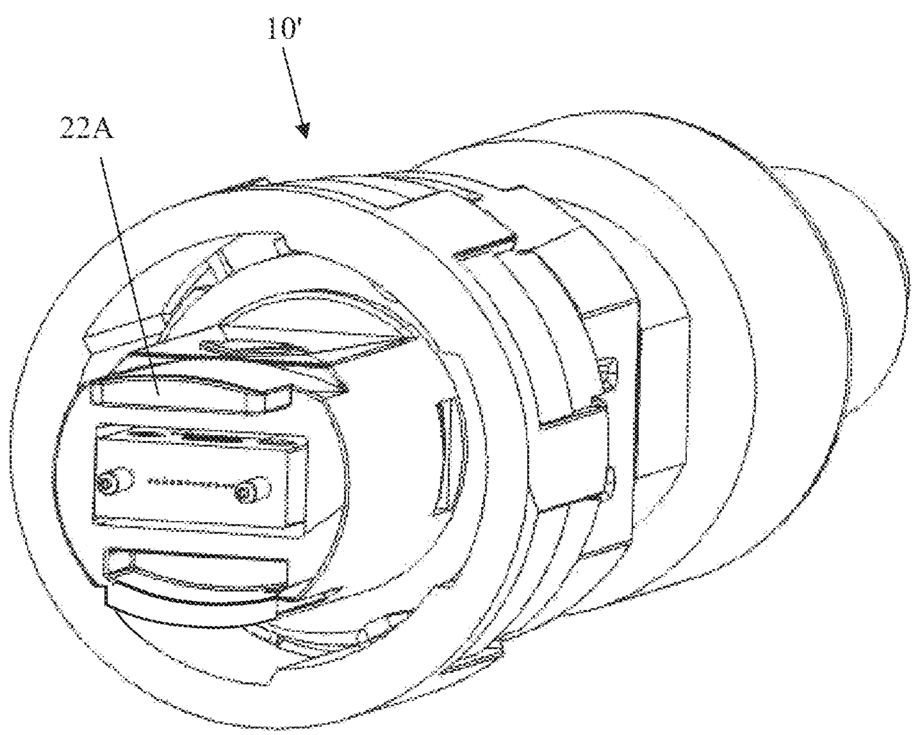
FIG. 64 is a front perspective of a fiber optic connector according to another embodiment of the present disclosure.

The front end portion 18 includes one or more protectors 22. In the illustrated embodiment, the outer housing 14 includes two protectors 22A, 22B. The protectors 22A, 22B project forward of the front end face 20 of the outer housing 14. In the illustrated embodiment, the protectors 22A, 22B extend forward from the front end face 20. The protectors 22A, 22B are shaped and arranged to protect the portion of the ferrule 12 that is forward of the front end face 20 of the outer housing 14. When the fiber optic connector 10 is in the orientation shown in FIG. 6, one (e.g., a first) protector 22A overlies the ferrule 12 and the other (e.g., second) protector 22B underlies the ferrule. The one or more protectors 22 are configured so that the fiber optic connector 10 and another fiber optic connector of identical construction (see FIG. 20) can, starting in the same orientation, can be mated together to form the optical connection by rotating said other fiber optic connector 180 degrees about an axis A (FIG. 2) perpendicular to the longitudinal centerline axis LCA, aligning the longitudinal centerlines axes of the fiber optic connectors and moving the fiber optic connectors along the longitudinal centerline axes until the fiber optic connectors are mated to form the optical connection (see FIGS. 19-21). In other embodiments, the front end portion 18 may only include one of the two protectors 22A, 22B. An example of such a fiber optic connector is generally indicated by reference numeral 10' in FIG. 64. In this embodiment, the fiber optic connector 10' only includes the first protector 22A but is otherwise identical to the fiber optic connector 10 of FIGS. 1-6.

Figure 6:
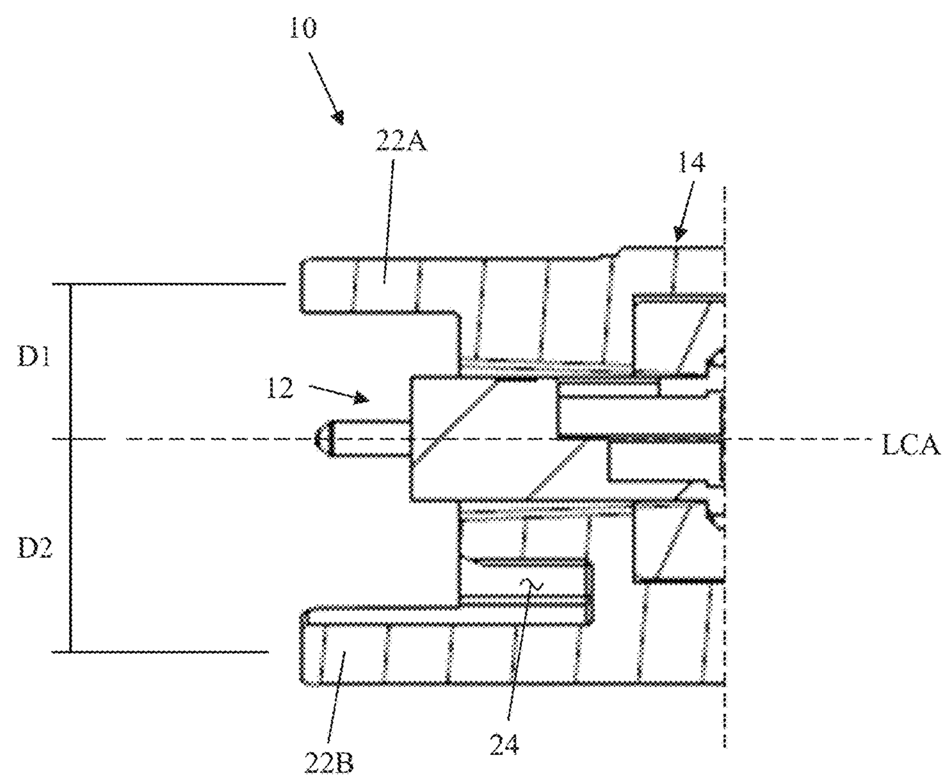
FIG. 6 is an enlarged fragment of FIG. 5.
Figure 7:
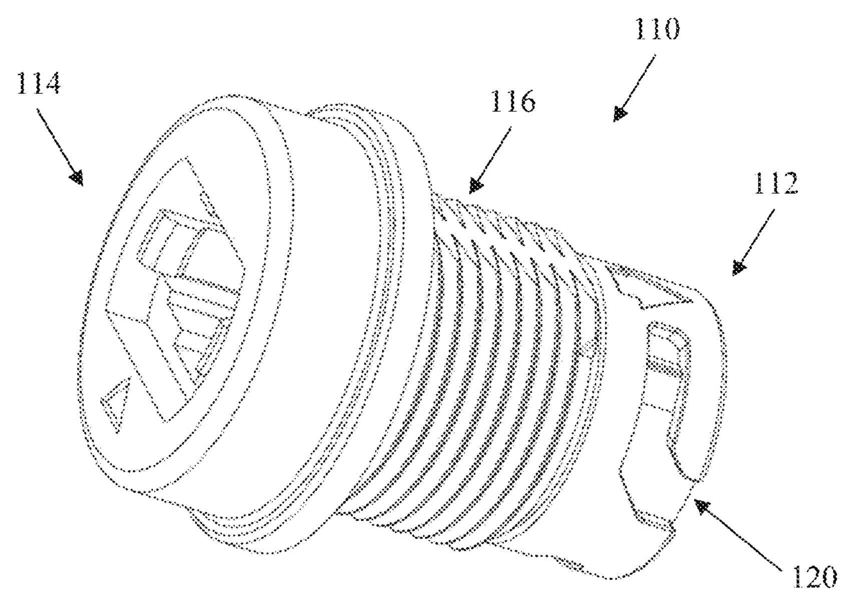
FIG. 7 is a side perspective of an adapter according to one embodiment of the present disclosure for coupling to the fiber optic connector of FIG. 1 and a conventional fiber optic connector.
Figure 8:
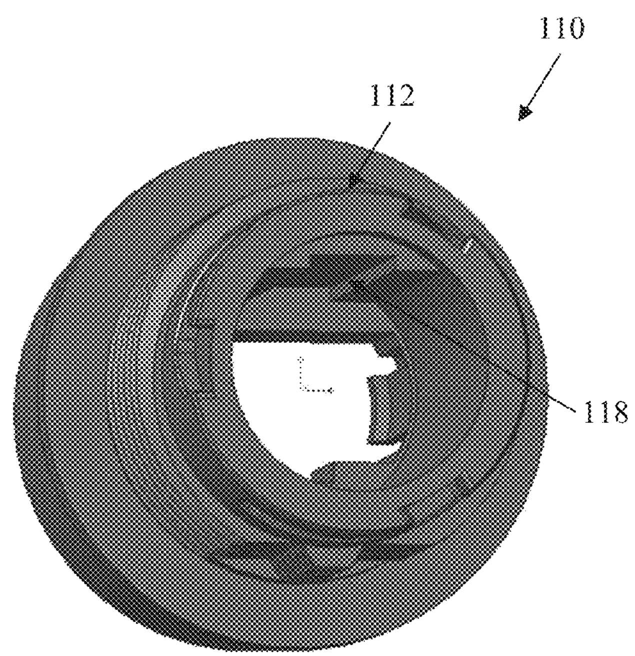
FIG. 8 is a rear perspective thereof.
Figure 9:
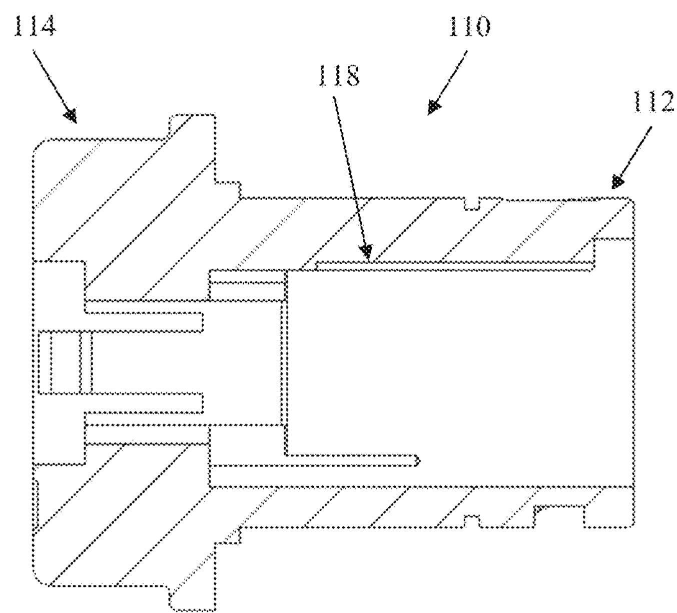
FIG. 9 is a vertical section thereof.
Figure 10:
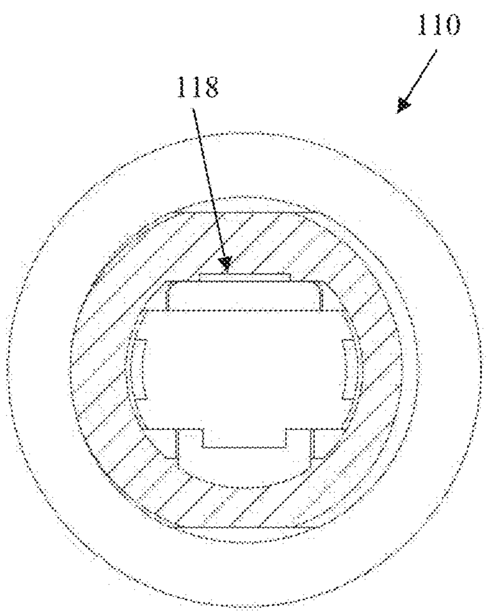
FIG. 10 is cross-section thereof.
Figure 11:
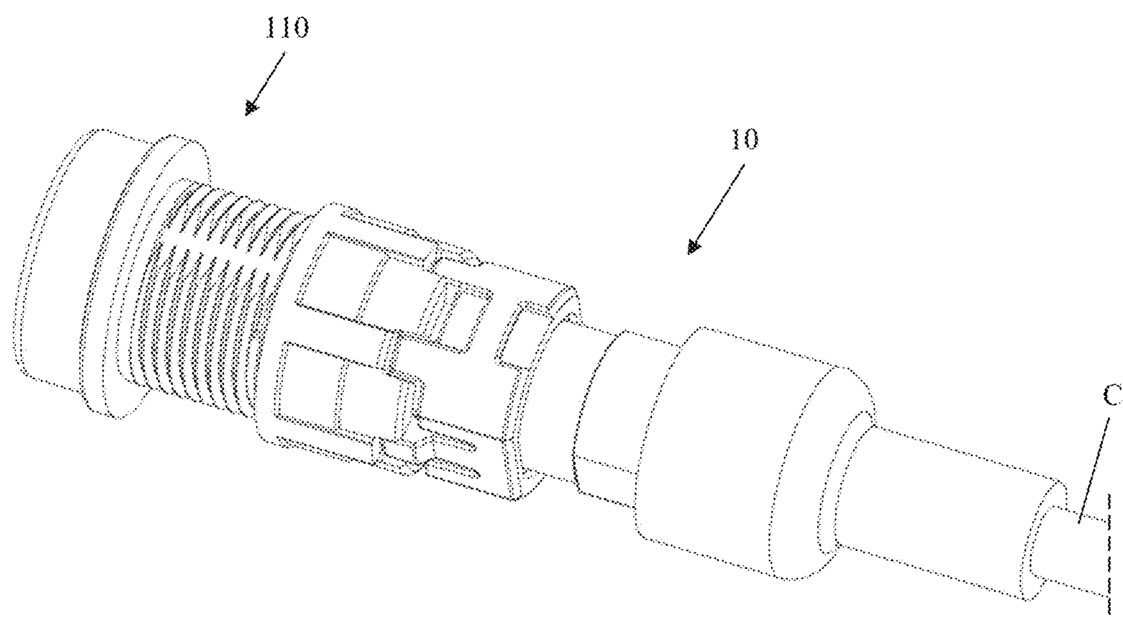
FIG. 11 is a perspective of the fiber optic connector of FIG. 1 attached to the adapter of FIG. 7.
Figure 12:
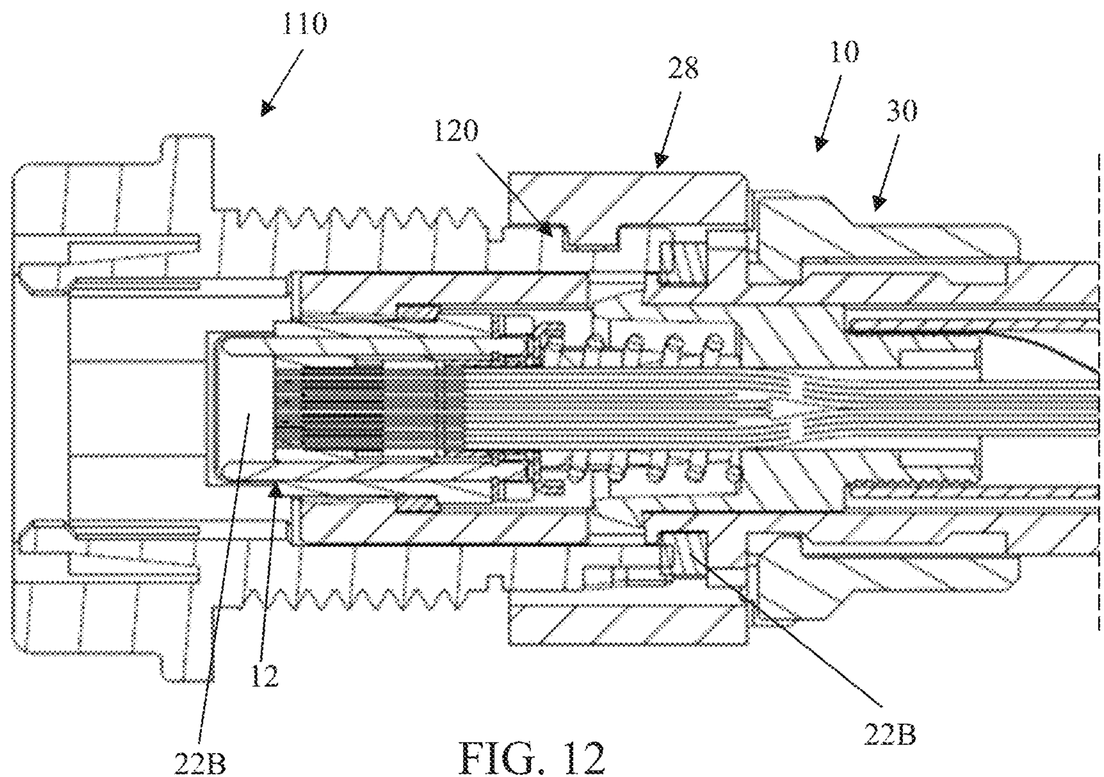
FIG. 12 is a horizontal section of FIG. 11.
Figure 13:
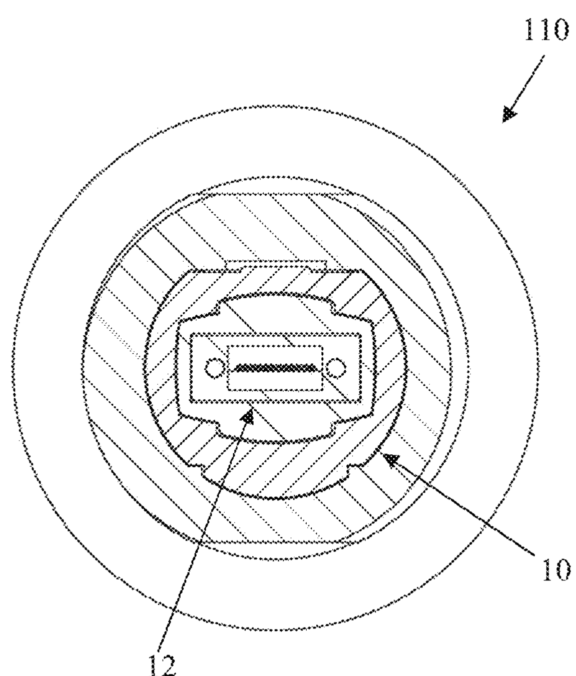
FIG. 13 is a cross-section of FIG. 11.

Referring to FIG. 6, the first protector 22A is arranged asymmetrically with respect to the second protector 22B about a plane including the longitudinal centerline axis LCA of the outer housing 14 (e.g., a plane including the longitudinal centerline axis LCA and axis A). The plane does not intersect any of the first or second protectors 22A, 22B. In this embodiment, the first protector 22A is offset a first distance D1 from the longitudinal centerline axis LCA and the second protector 22B is offset a second distance D2 from the longitudinal centerline axis. The second distance D2 is different than the first distance D1. Specifically, the second distance D2 is greater than the first distance D1. In this embodiment, the first and second protectors 22A, 22B are only offset in the y-direction (e.g., parallel to an axis that is perpendicular to both the axis A and the longitudinal centerline axis LCA) and are not offset in the x-direction (e.g., parallel to the axis A in FIG. 2) and z-direction (e.g., parallel to the longitudinal centerline axis). In the illustrated embodiment, each protector 22A, 22B comprises a wall. The wall of each protector 22A, 22B may be generally planar (e.g., planar surfaces), arcuate about the longitudinal centerlines axis LCA (e.g., arcuate surfaces) or a combination thereof (e.g., a planar surface and an opposite arcuate surface).

The front end portion 18 of the outer housing 14 defines one or more protector pockets 24. Each protector pocket 24 is configured to receive one or more protectors of said other fiber optic device (e.g., the other fiber optic connector 10). In the illustrated embodiment, the front end portion 18 includes one protector pocket 24, although more are within the scope of the present disclosure. The protector pocket 24 is sized, shaped, and arranged to receive one of the one or more protectors 22 (specifically, the first protector 22A) of the other fiber optic connector 10 (FIGS. 19-21). In the illustrated embodiment, the protector pocket 24 is rearward of the front end face 20. The protector pocket 24 comprises a recess. The recess of the protector pocket 24 generally extends rearward from the front end face 20. The protector pocket 24 is disposed between the second protector 22B and the longitudinal centerline axis LCA. The protector pocket 24 is offset the same distance (e.g., first distance D1) from the longitudinal centerline axis LCA as the first protector 22A.

Referring to FIGS. 7-14, one embodiment of an adapter (e.g., fiber optic adapter) for connecting to the fiber optic connector 10 of FIGS. 1-6 is generally indicated by reference numeral 110. The adapter 110 is configured to couple the fiber optic connector 10 of FIGS. 1-6 to a conventional fiber optic connector 1 (FIG. 14) (broadly, a fiber optic connector of a construction different than the fiber optic connector of FIGS. 1-6). The conventional fiber optic connector 1 has one or more ferrules corresponding to the one or more ferrules 12 of the fiber optic connector 10. Accordingly, in this embodiment, the conventional fiber optic connector 1 is a MPO fiber optic connector with a MPO ferrule that mates with the MPO ferrule 12 of the fiber optic connector 10 to form the optical connection within the adapter 110. The adapter 110 (e.g., an MPO adapter) includes a first port 112 configured to receive the fiber optic connector 10 and a second port 114 configured to receive the conventional fiber optic connector 1. The second port 114 is generally opposite the first port 112. The first and second ports 112, 114 are arranged such that the fiber optic connector 10 and the other (e.g., conventional) fiber optic connector 1 form the optical connection when the fiber optic connector and the other fiber optic connector are disposed in (e.g., coupled to) the adapter 110. The first port 112 defines a first cavity sized and shaped to receive the fiber optic connector 10. The second port 114 defines a second cavity sized and shaped to receive the other (e.g., conventional) fiber optic connector 1. The first and second cavities are in open communication with one another.

The adapter 110 includes a housing 116. In the illustrated embodiment, the housing 116 includes external threads for threadably coupling to a nut (not shown) to attach the adapter 110 to a panel (not shown) the adapter extends through. The first port 112 may include an alignment guide 118 (FIG. 8) configured to engage the outer housing 14 of the fiber optic connector 10 to orient the outer housing relative to the adapter 110. In the illustrated embodiment, the alignment guide 118 is a channel. The outer housing 14 of the fiber optic connector 10 includes an alignment key 26 (FIG. 3) sized and shaped to be inserted into the channel of the alignment guide 118 as the fiber optic connector 10 is inserted into the adapter 110 to orient the fiber optic connector. The first port 112 may also include a coupling element 120 (e.g., a first coupling element) configured to secure the fiber optic connector 10 to the adapter 110. Likewise, the fiber optic connector 10 includes a coupling element 28 (e.g., a second coupling element) configured to secure the fiber optic connector to the adapter 110. Specifically, the second coupling element 28 (FIG. 12) of the fiber optic connector 10 is configured to engage (e.g., mate with, couple to) the first coupling element 120 of the adapter 110 to secure the fiber optic connector to the first port 112. The second coupling element 28 may comprise a coupling nut. In the illustrated embodiment, the coupling nut is a bayonet style coupling nut. In the illustrated embodiment, the first coupling element 120 comprises one or more bayonet slots configured to receive respective bayonet projections of the coupling nut of the second coupling element 28 to secure the fiber optic connector 10 to the adapter 110 (see FIG. 12). The coupling nut is rotatable about the outer housing 14 (e.g., longitudinal centerline axis LCA) for connecting and disconnecting with the first coupling element 120. In the illustrated embodiment, the fiber optic connector 10 further includes a locking element 30 (e.g., locking collar). The locking element 30 is releasably engageable with the second coupling element 28 (e.g., coupling nut). When the locking element 30 is engaged with the second coupling element 28, the locking element inhibits rotation of the second coupling element, thereby preventing unintentional decoupling of the fiber optic connector 10 with the first port 112. When the locking element 30 is disengaged with the second coupling element 28, the second coupling element is free to rotate about the outer housing 14 to couple to or decouple from the first coupling element 120 of the adapter 110. The locking element 30 may slide longitudinally along the outer housing 14 between a locking position (e.g., engaged with the second coupling element 28) and a release position (e.g., disengaged with the second coupling element).

In one embodiment, the fiber optic connector 10 is configured for outdoor use. For example, the fiber optic connector 10 may include a seal or gasket 32 (FIG. 3) configured to form a seal with the adapter 110 to inhibit the ingress of water and other debris into the cavity of the first port 112.

Referring to FIGS. 15-21, another embodiment of an adapter (e.g., an MPO adapter) according to the present disclosure is generally indicated by reference numeral 210. Adapter 210 is generally analogous to adapter 110 and, thus, for ease of comprehension, where similar, analogous or identical parts are used, reference numerals "100" units higher are employed. Accordingly, unless clearly stated or indicated otherwise, the above descriptions regarding adapter 110 also apply to adapter 210.

In this embodiment, the adapter 210 is an in-line adapter for connecting to two fiber optic connectors 10 of FIGS. 1-6 to each other. The second port 214 is generally identical to the first port 212 (e.g., is configured to receive the fiber optic connector 10). In particular, the features of the second port 214 are generally flipped over 180 degrees about the axis A relative to the features of the first port 214. The first and second ports 212, 214 are offset to accommodate the offset arrangement of the protectors 22. As shown in FIG. 20, when first and second fiber optic connectors 10 are attached to the adapter 210, their longitudinal centerline axes LCAs are generally aligned. The first protector 22A of each fiber optic connector 10 is disposed in the respective protector pocket 24 of the other fiber optic connector. Likewise, the second protector 22B of each fiber optic connector 10 generally overlies (or underlies) the respective first protector 22B of the other fiber optic connector. Stated another way, the second protector 22B is located radially outward of the adjacent first protector 22A of the other connector with respect to the longitudinal centerline axis LCA. Thus, the fiber optic connectors 10 form a mating connection with each other within the adapter 210. This mating connection mechanically strengthens the connection between the two fiber optic connectors 10.

Referring to FIGS. 23-27, another embodiment of a fiber optic adapter according to the present disclosure is generally indicated by reference numeral 310. Fiber optic connector 310 is generally analogous to adapter 10 and, thus, for ease of comprehension, where similar, analogous or identical parts are used, reference numerals "300" units higher are employed. Accordingly, unless clearly stated or indicated otherwise, the above descriptions regarding fiber optic connector 10 also apply to fiber optic connector 310.

In this embodiment, the ferrule 312 of the fiber optic connector 310 is a subscriber (SC) ferrule. The SC ferrule 312 is generally aligned with the longitudinal centerline axis LCA. Another difference is that the fiber optic connector 310 of this embodiment has a different configuration of protectors 322 than that of the fiber optic connector in FIGS. 1-6. In this embodiment, the first protector 322A is still arranged asymmetrically with respect to the second protector 322B about a plane including the longitudinal centerline axis LCA of the outer housing 314 (e.g., a plane including the longitudinal centerline axis LCA and axis A). Although the first and second protectors 322A, 322B are offset the same distance (in opposite directions) from the longitudinal centerline axis LCA in a y-direction (e.g., parallel to an axis that is perpendicular to both the axis A and the longitudinal centerline axis LCA), they are offset in opposite directions in the x-direction (e.g., parallel to the axis A in FIG. 2) relative to each other in different directions. Therefore, the protectors 322A, 322B are not symmetrical about the plane including the longitudinal centerline axis LCA and the axis A.

Figure 39:
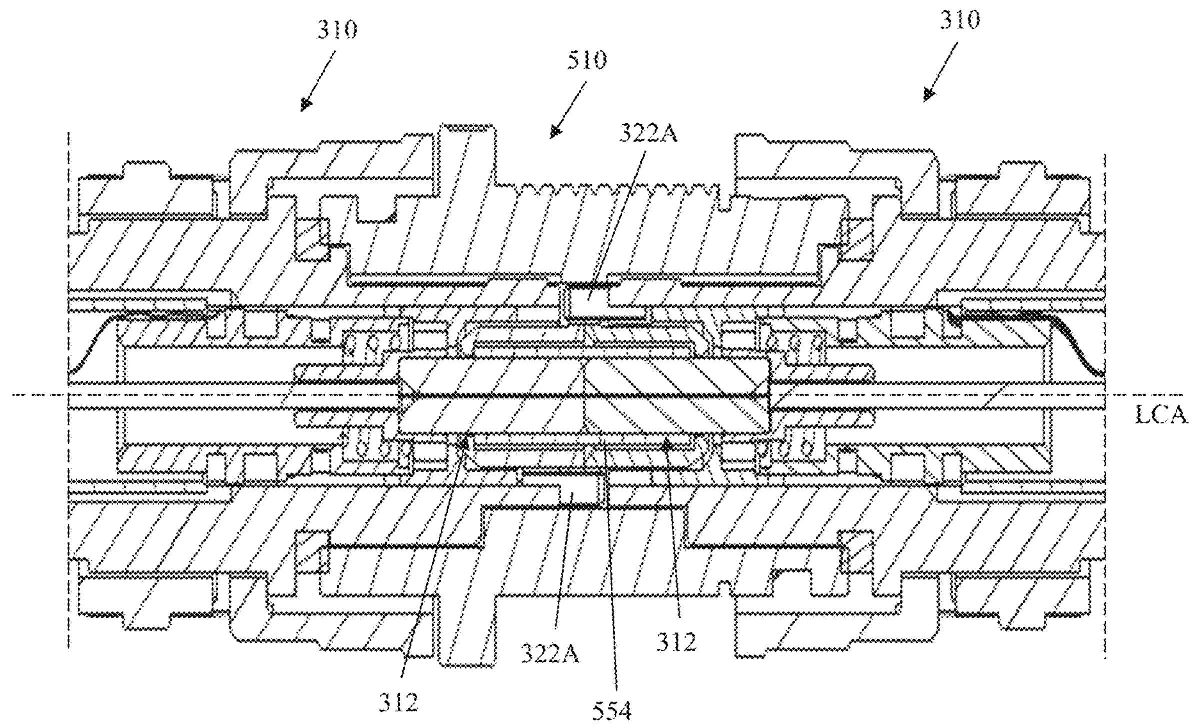
FIG. 39 is an enlarged, fragmentary vertical section thereof.
Figure 40:
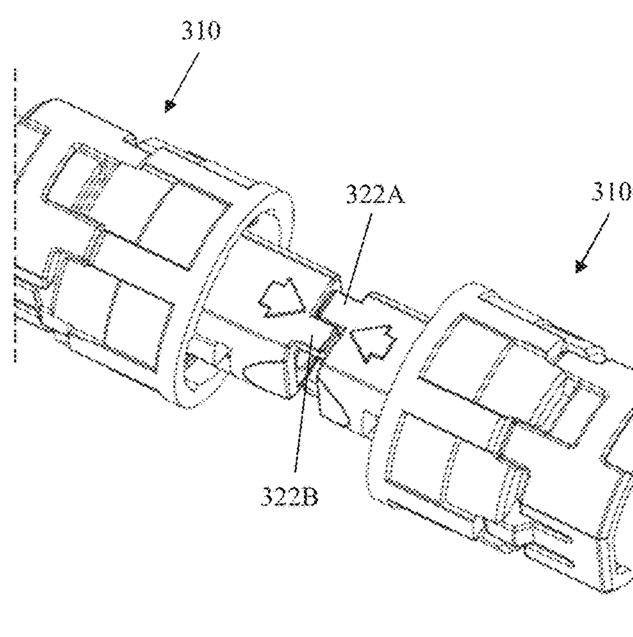
FIG. 40 is similar to FIG. 38, with the adapter hidden from view to reveal interior details.
Figure 41:
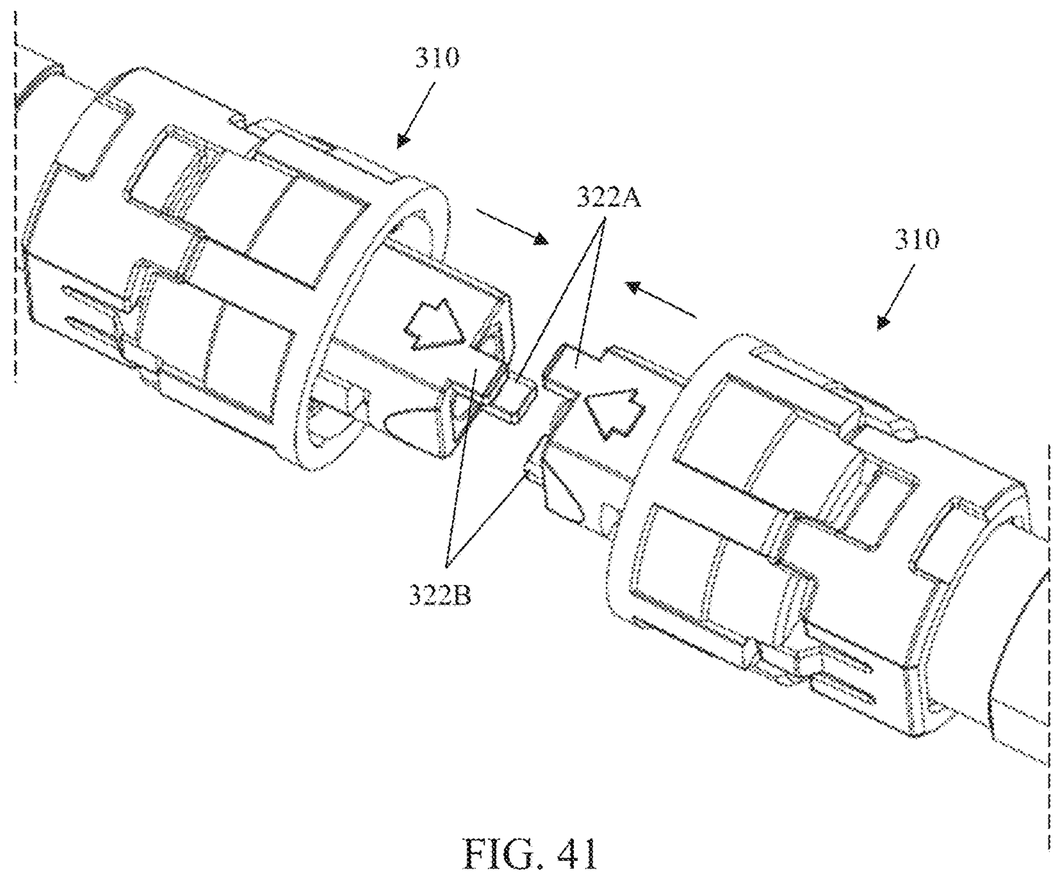
FIG. 41 is a perspective of two fiber optic connectors of FIG. 23 aligned for mating engagement with each other.
Figure 42:
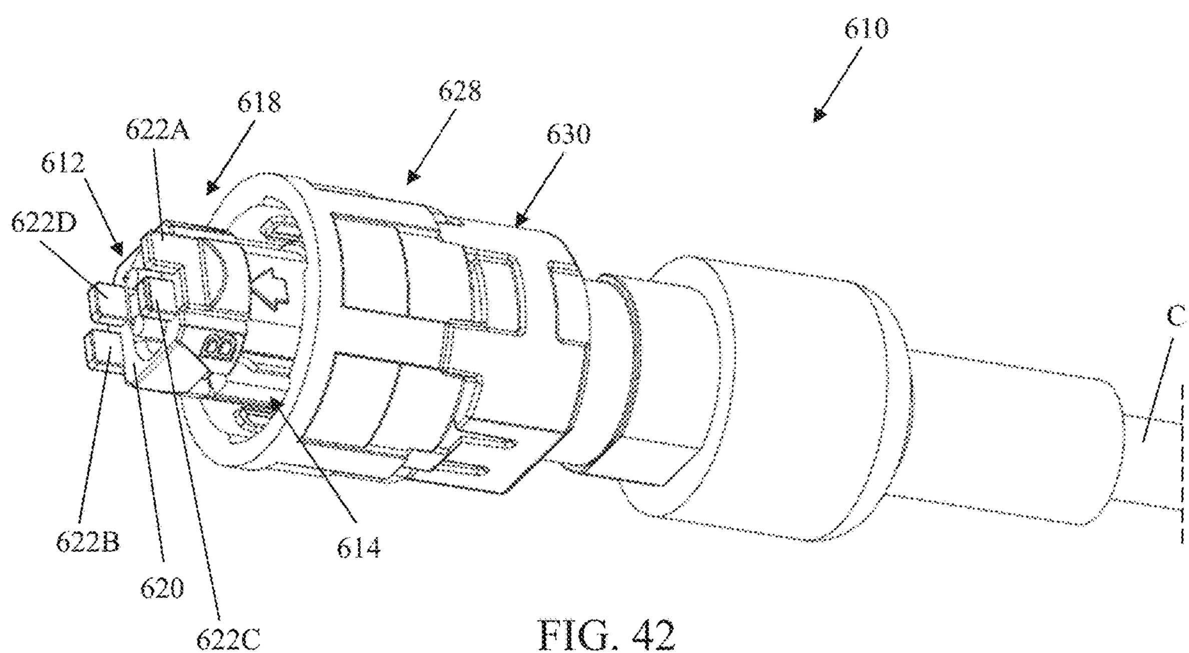
FIG. 42 is a side perspective of a fiber optic connector according to another embodiment of the present disclosure.

In this embodiment, the front end portion 318 of the outer housing 314 defines two protector pockets 324 (broadly, two or more protector pockets). Each protector pocket 324 is configured to receive one of the protectors 322A, 322B of said other fiber optic device (e.g., the other fiber optic connector 310). The first protector pocket 324A is sized, shaped, and arranged to receive the second protector 322B of the other fiber optic connector 310 and the second protector pocket 324B is sized, shaped, and arranged to receive the first protector 322A of the other fiber optic connector (FIGS. 39-41). In this embodiment, the protector pockets 324 are forward of the front end face 320. Each protector pocket 324 is generally defined by the front end face 320 and one of the protectors 322. The fiber optic connector 310 and another fiber optic connector of identical construction (see FIGS. 39-41) can, starting in the same orientation, can be mated together to form the optical connection by rotating said other fiber optic connector 180 degrees about the axis A (e.g., an x-axis), aligning the longitudinal centerlines axes LCA of the fiber optic connectors and moving the fiber optic connectors along the longitudinal centerline axes until the fiber optic connectors are mated to form the optical connection. In this embodiment, the axis about which the identical fiber optic connector 310 rotates 180 degrees could also be a y-axis. The first and second protector pockets 324A, 324B are offset the same distance (in opposite directions) from the longitudinal centerline axis LCA. In this embodiment, the first and second protector pockets 324A, 324B are offset in the y-direction (e.g., parallel to an axis that is perpendicular to both the axis A and the longitudinal centerline axis LCA) and offset in the x-direction (e.g., parallel to the axis A in FIG. 2) relative to each other.

Referring to FIGS. 28-33, another embodiment of an adapter (e.g., an SC adapter) according to the present disclosure is generally indicated by reference numeral 410. Adapter 410 is generally analogous to adapter 110 and, thus, for ease of comprehension, where similar, analogous or identical parts are used, reference numerals “300” units higher are employed. Accordingly, unless clearly stated or indicated otherwise, the above descriptions regarding adapter 110 also apply to adapter 410.

Figure 33:
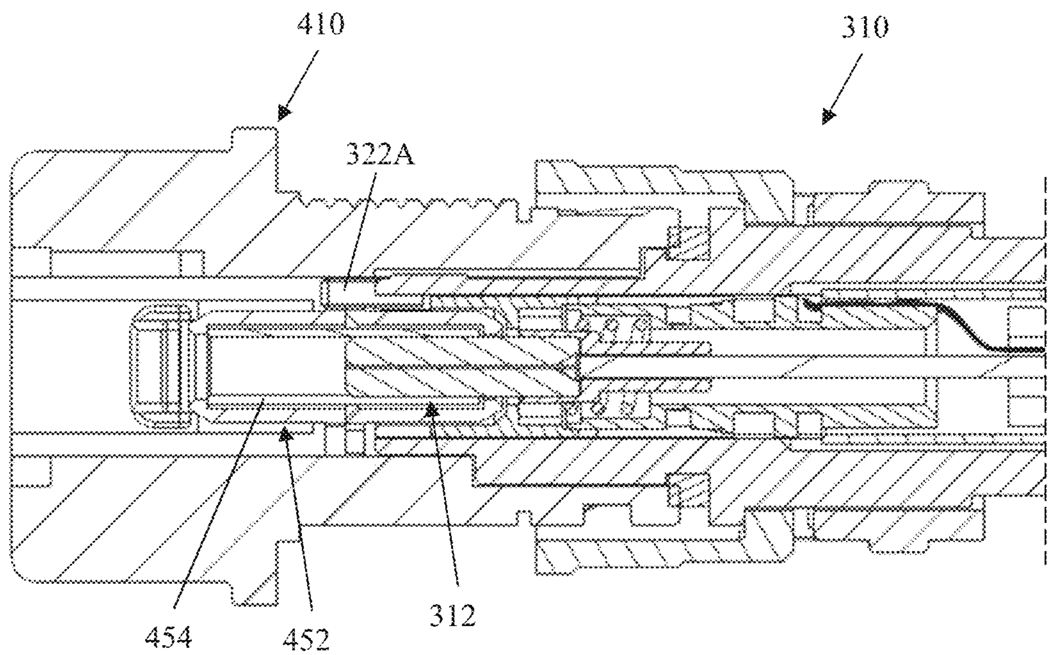
FIG. 33 is a vertical section thereof.
Figure 34:
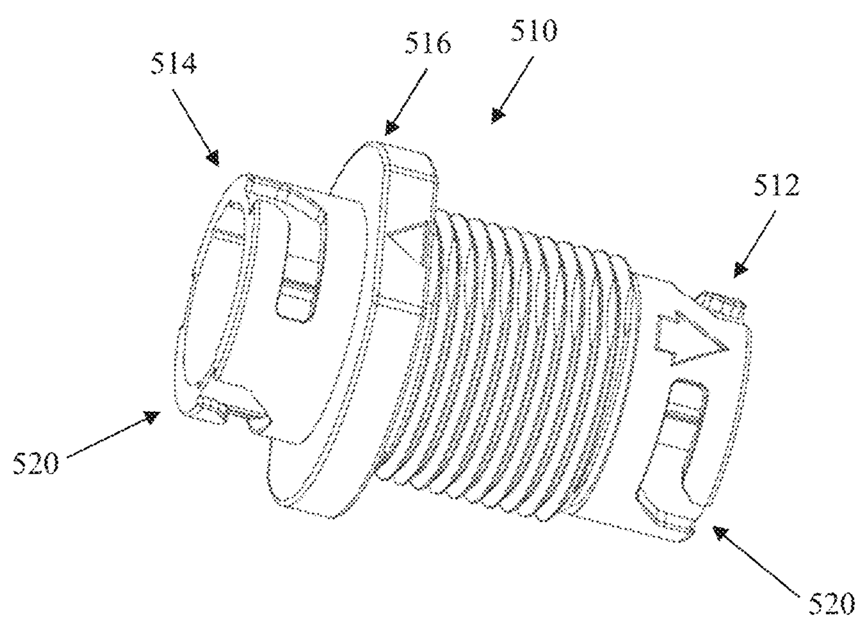
FIG. 34 is a side perspective of an adapter according to another embodiment of the present disclosure for coupling two fiber optic connectors of FIG. 23.
Figure 35:
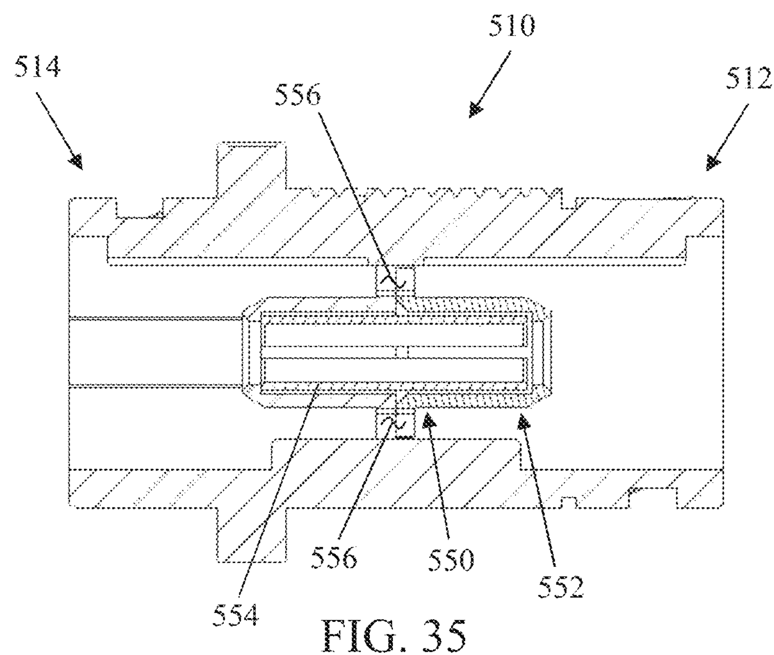
FIG. 35 is a vertical section thereof.
Figure 36:
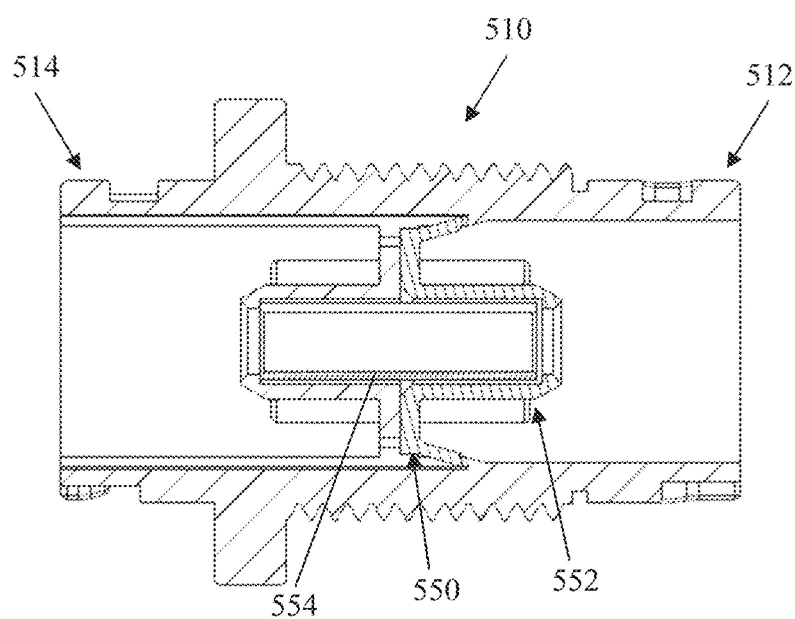
FIG. 36 is a horizontal section thereof.
Figure 37:
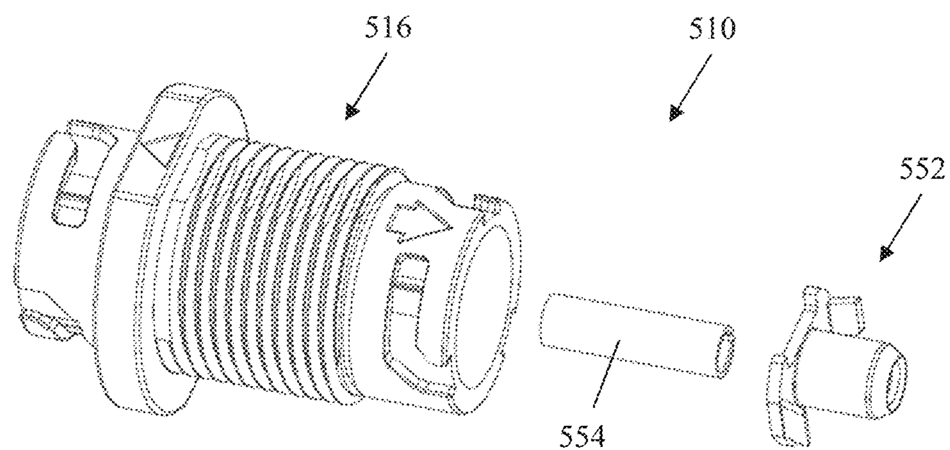
FIG. 37 is an exploded view thereof.
Figure 38:
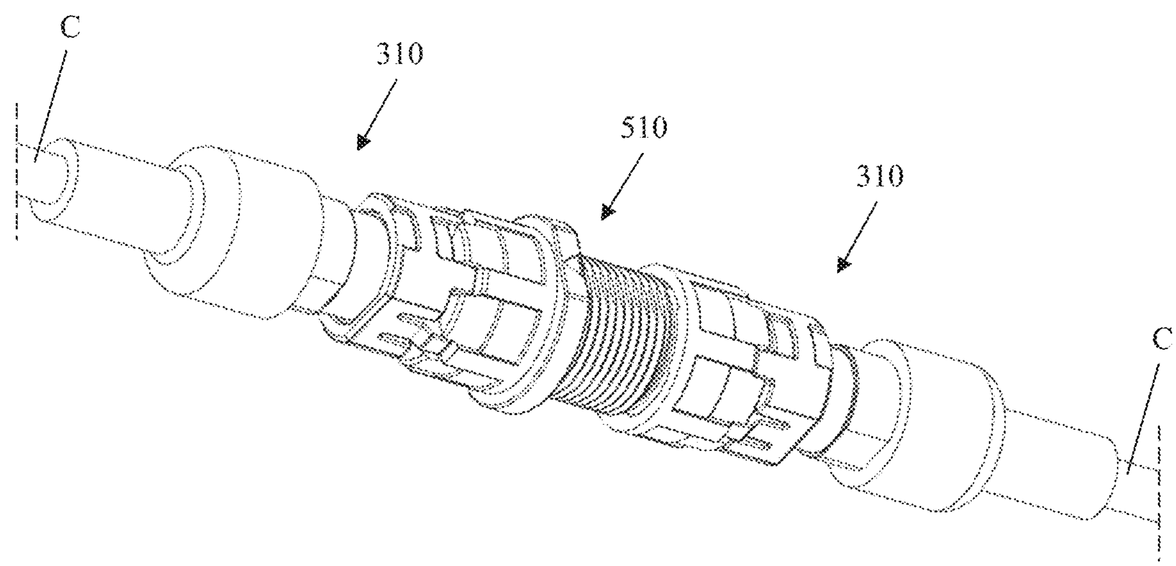
FIG. 38 is a perspective of two fiber optic connectors of FIG. 23 attached to the adapter of FIG. 34.

In this embodiment, the adapter 410 is for connecting to the fiber optic connector 310 of FIGS. 23-27. The adapter 410 is configured to couple the fiber optic connector 310 of FIGS. 23-27 to a conventional fiber optic connector (not shown) (e.g., a convention SC fiber optic connector). The first port 412 of the adapter 410 is configured to receive the fiber optic connector 410 and a second port 414 configured to receive the conventional fiber optic connector. In this embodiment, the adapter 410 includes an alignment sleeve assembly 450 including an alignment sleeve mount 452 and an alignment sleeve 454. The alignment sleeve is configured to receive the SC ferrule 312 of the fiber optic connector 310 and other fiber optic device so that the optical connection forms therein. The alignment sleeve mount 452 positions the alignment sleeve 454 within the cavities of the first and second ports 412, 414. The adapter 410 (e.g., the alignment sleeve mount 452 and/or housing 416) defines one or more windows 456 (FIG. 29) size, shaped and arranged to receive one or more of the protectors 322 of the one or two fiber optic connectors 310. In the illustrated embodiment, each window 456 is sized and shaped to receive two protectors 322, one from each fiber optic connector. When the fiber optic connector 310 is attached to the adapter 410, the protectors 322 extend into their corresponding window 456 (FIG. 33). In this embodiment, the alignment sleeve mount 452 is also configured to form a snap-connection with the conventional SC fiber optic connector to secure and hold the connector to the adapter 410.

In the illustrated embodiment, the adapter 410 is made from several components that are assembled together. For example, the alignment sleeve mount 452 snaps into the adapter housing 416. In the illustrated embodiment, a portion of the adapter sleeve mount 452 is integrally formed with the adapter housing 416 and a portion (e.g., snap-in portion) of the adapter sleeve mount is a separate component. Other configurations are within the scope of the present disclosure. For example, the entire adapter 410 can be an integral, one-piece component.

Referring to FIGS. 34-41, another embodiment of an adapter (e.g., a SC adapter) according to the present disclosure is generally indicated by reference numeral 510. Adapter 510 is generally analogous to adapter 410 and, thus, for ease of comprehension, where similar, analogous or identical parts are used, reference numerals “100” units higher are employed. Accordingly, unless clearly stated or indicated otherwise, the above descriptions regarding adapter 410 also apply to adapter 510.

In this embodiment, the adapter 510 is for connecting to two fiber optic connectors 310 of FIGS. 28-33 to each other. The second port 514 is generally identical to the first port 512 (e.g., is configured to receive the fiber optic connector 310). In particular, the features of the second port 514 are generally flipped over 180 degrees about the axis A relative to the features of the first port 514. The first and second ports 512, 514 are aligned (e.g., longitudinally aligned). The alignment sleeve mount 452 does not snap connect to either connector in this embodiment. As shown in FIG. 39, when first and second fiber optic connectors 310 are attached to the adapter 510, their longitudinal centerline axes LCAs are generally aligned. The first protector 322A of each fiber optic connector 310 is disposed in the respective second protector pocket 324B of the other fiber optic connector. Likewise, the second protector 322B of each fiber optic connector 310 is disposed in the respective first protector pocket 324A of the other fiber optic connector. The first and second protectors 322A, 322B also extend into their corresponding windows 556 of the adapter 510. Thus, the fiber optic connectors 310 form a mating connection with each other within the adapter 510. This mating connection mechanically strengthens the connection between the two fiber optic connectors 310.

Referring to FIGS. 42-47, another embodiment of a fiber optic adapter according to the present disclosure is generally indicated by reference numeral 610. Fiber optic connector 610 is generally analogous to adapter 310 and, thus, for ease of comprehension, where similar, analogous or identical parts are used, reference numerals "300" units higher are employed. Accordingly, unless clearly stated or indicated otherwise, the above descriptions regarding fiber optic connector 310 also apply to fiber optic connector 610.

In this embodiment, the ferrule 612 of the fiber optic connector 610 is a local connector (LC) ferrule. The fiber optic connector 610 includes two LC ferrules 612. Another difference is that the fiber optic connector 610 of this embodiment has a different configuration of protectors 622 than that of the fiber optic connector in FIGS. 23-27. In addition to the first and second protectors 622A, 662B, which are generally identical to the first and second protectors 322A, 322B of FIGS. 23-27, the fiber optic connector 610 includes third and fourth protectors 622C, 622D. The arrangement of the third and fourth protectors 622C, 622D is also asymmetrical about a plane including the longitudinal centerline axis LCA and the axis A. The third protector 622C is arranged symmetrically with respect to the fourth protector 622D about a plane including the longitudinal centerline axis LCA of the outer housing 614 (e.g., a plane including the longitudinal centerline axis LCA and axis A). The third and fourth protectors 622C, 622D are offset the same distance (in opposite directions) from the longitudinal centerline axis LCA. In this embodiment, the third and fourth protectors 622C, 622D are offset in the y-direction and offset in the x-direction relative to each other. In addition, the third and fourth protectors 622C, 622D are offset in the x-direction and the y-direction from the first and second protectors 622A, 622B.

Figure 43:
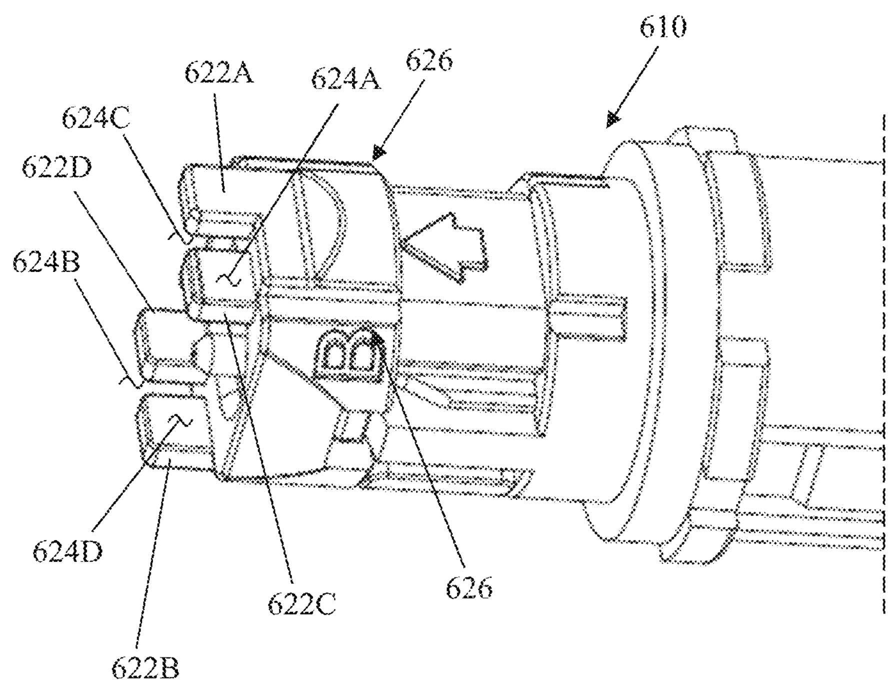
FIG. 43 is an enlarged, fragmentary side perspective thereof, with a coupling element of the fiber optic connector hidden from view to reveal interior details.
Figure 44:
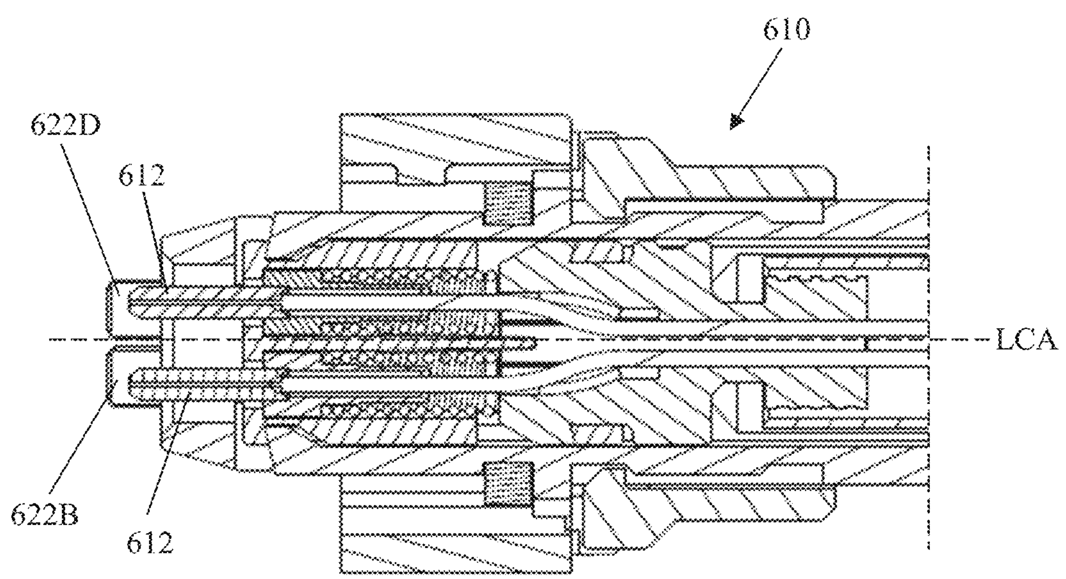
FIG. 44 is an enlarged, fragmentary horizontal section of the fiber optic connector of FIG. 42.
Figure 45:
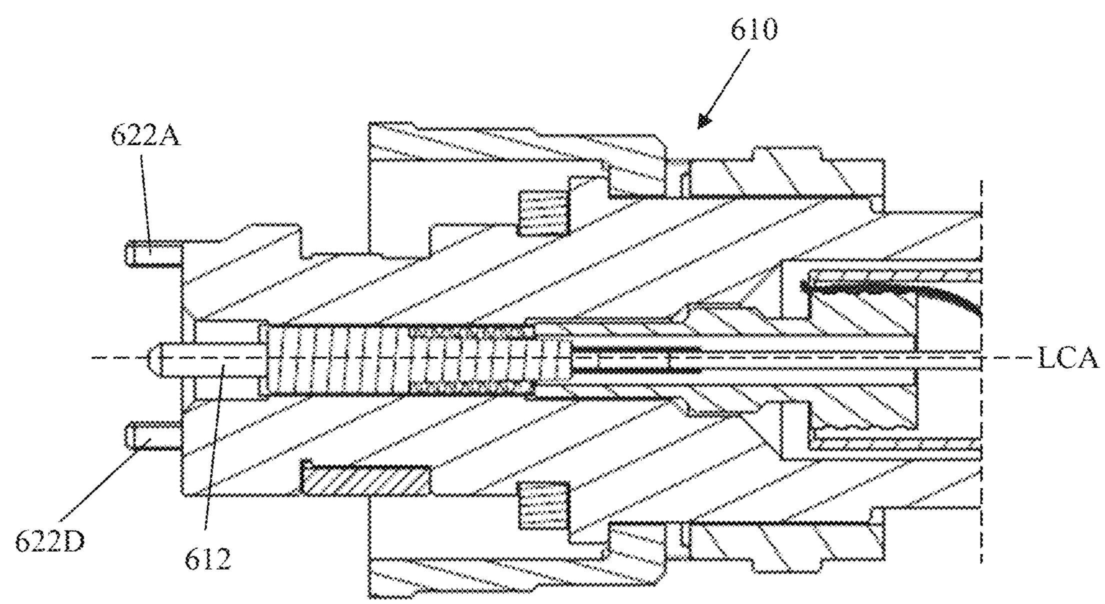
FIG. 45 is an enlarged, fragmentary vertical section of the fiber optic connector of FIG. 42.

In this embodiment, the front end portion 618 of the outer housing 614 defines the first and second protector pockets 624A, 624B, which are generally identical to the first and second protector pockets 324A, 324B of FIGS. 23-27, and third and fourth protector pockets 624C, 624D. The third protector pocket 624C is sized, shaped, and arranged to receive the fourth protector 622D of the other fiber optic connector 610 and the fourth protector pocket 624D is sized, shaped, and arranged to receive the third protector 622C of the other fiber optic connector (FIGS. 59-63). Referring to FIG. 43, each protector pocket 624 is generally defined by the front end face 620 and two of the protectors 622. The first and third protector pockets 624A, 624C are bounded or bordered by (e.g., underlid by, overlade by) the first and third protectors 622A, 622C. The second and fourth protector pockets 624B, 624D are bounded or bordered by (e.g., underlaid by, overlaid by) the second and fourth protectors 622B, 622D.

The protector pockets 624 are also asymmetrically arranged with respect to a plane including the longitudinal centerline axis LCA and axis A. The fiber optic connector 610 and another fiber optic connector of identical construction (see FIGS. 59-63) can, starting in the same orientation, can be mated together to form the optical connection by rotating said other fiber optic connector 180 degrees about the axis A (e.g., an x-axis), aligning the longitudinal centerlines axes LCA of the fiber optic connectors and moving the fiber optic connectors along the longitudinal centerline axes until the fiber optic connectors are mated to form the optical connection. The third and fourth protector pockets 624C, 624D are offset the same distance (in opposite directions) from the longitudinal centerline axis LCA. In this embodiment, the third and fourth protector pockets 624C, 624D are offset in the y-direction and offset in the x-direction relative to each other.

Referring to FIGS. 48-53, another embodiment of an adapter (e.g., an LC adapter) according to the present disclosure is generally indicated by reference numeral 710. Adapter 710 is generally analogous to adapter 410 and, thus, for ease of comprehension, where similar, analogous or identical parts are used, reference numerals "300" units higher are employed. Accordingly, unless clearly stated or indicated otherwise, the above descriptions regarding adapter 310 also apply to adapter 710.

In this embodiment, the adapter 710 is for connecting to the fiber optic connector 610 of FIGS. 42-47. The adapter 710 is configured to couple the fiber optic connector 610 of FIGS. 42-47 to a conventional fiber optic connector (not shown) (e.g., a convention LC fiber optic connector). The first port 712 of the adapter 710 is configured to receive the fiber optic connector 710 and a second port 714 configured to receive the conventional fiber optic connector. In this embodiment, the alignment sleeve assembly 752 of the adapter 710 includes two alignment sleeves 752, each configured to receive one of the LC ferrules 612 of the fiber optic connector 610 and other fiber optic device so that the optical connection forms therein. In this embodiment, the adapter 710 includes a conventional connector mount 750 that snaps into the housing 716 for forming part of the second port 714.

In this embodiment, the first port 112 includes two alignment guides 718 configured to engage the outer housing 614 of the fiber optic connector 610 to orient the outer housing relative to the adapter 710. In the illustrated embodiment, the alignment guide 718 is an elongate protrusion or rail that extends generally parallel to the longitudinal axis of the adapter 710. The outer housing 614 of the fiber optic connector 610 includes at least two alignment keys 626. In this embodiment, the alignment keys 626 (FIG. 43) comprise elongate channels, each sized and shaped to receive one of the alignment guides 718 as the fiber optic connector 610 is inserted into the adapter 710 to orient the fiber optic connector. The outer housing 614 includes two sets of two alignment keys 626 (one set on top, visible in FIG. 46, and one set on bottom, hidden from view in FIG. 46), so that the fiber optic connector 610 can be inserted in only one of two orientations (e.g., first and second polarity orientations, which are 180 degrees apart about the longitudinal centerline axis LCA) relative to the adapter 710.

Figure 46:
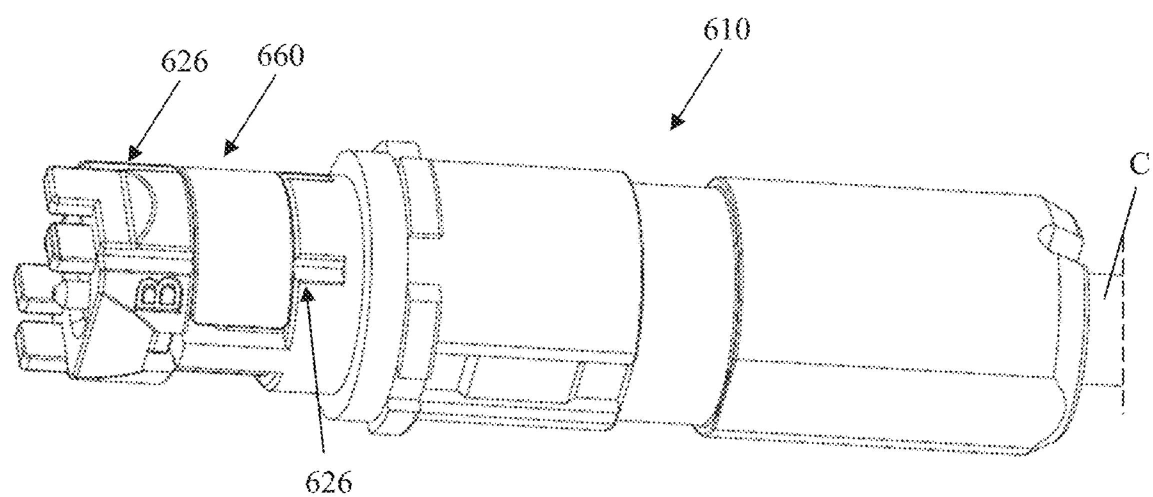
FIG. 46 is similar to FIG. 43, with the fiber optic connector including a polarity key.
Figure 47:
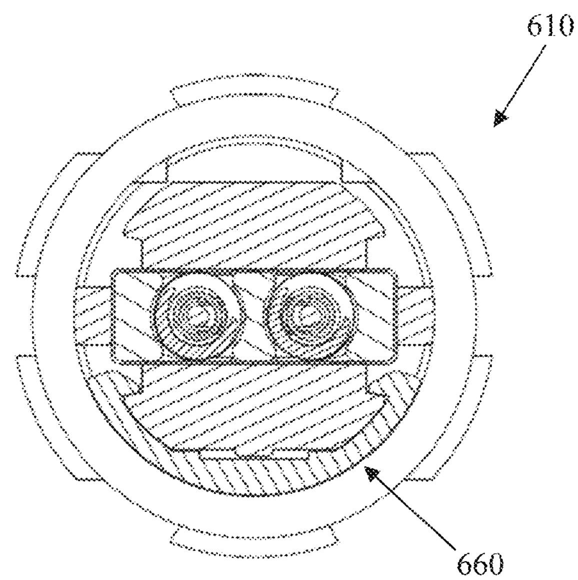
FIG. 47 is a cross-section of the fiber optic connector of FIG. 42.
Figure 48:
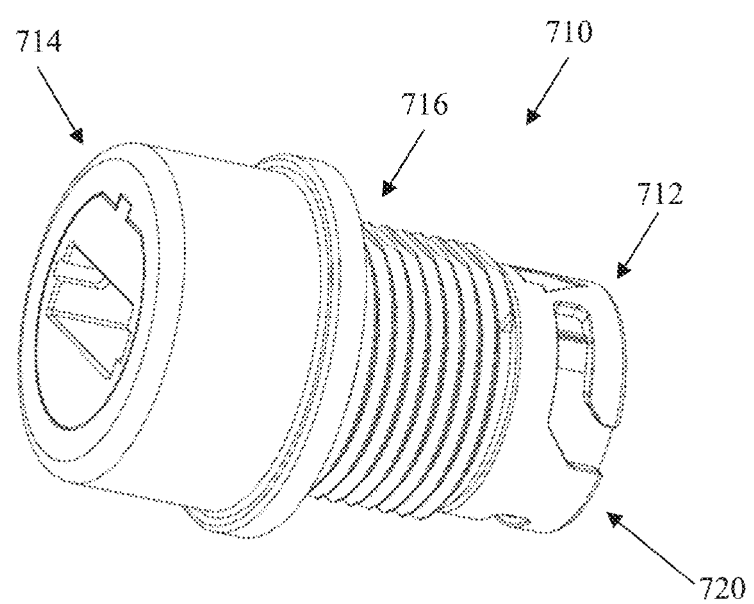
FIG. 48 is a side perspective of an adapter according to another embodiment of the present disclosure for coupling to the fiber optic connector of FIG. 42 and a conventional fiber optic connector.
Figure 49:
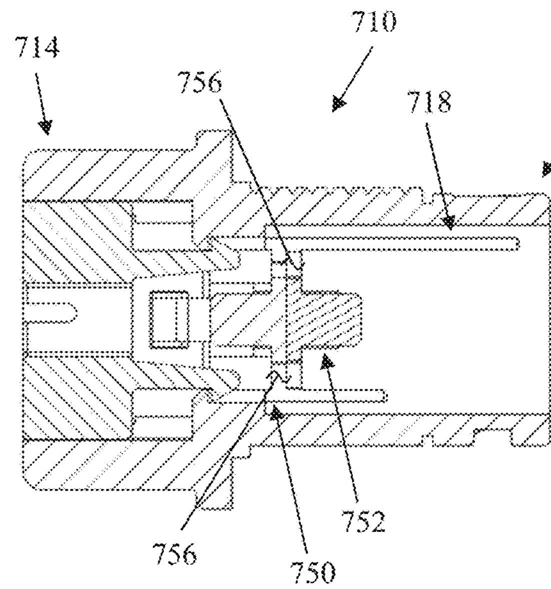
FIG. 49 is a vertical, longitudinal section thereof.
Figure 50:
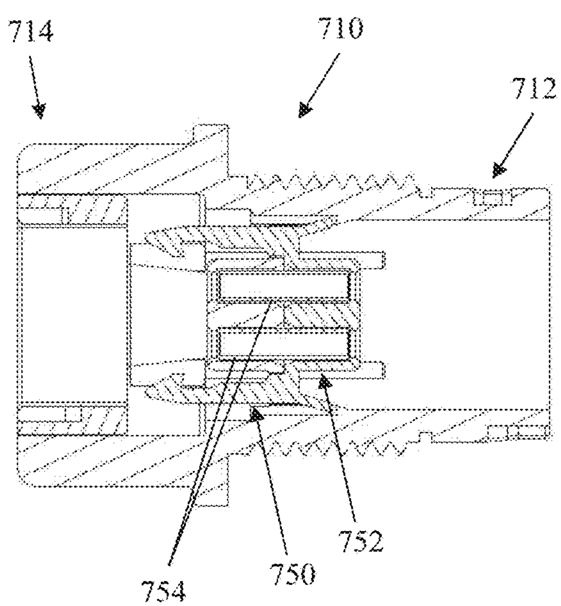
FIG. 50 is a horizontal, longitudinal section thereof.
Figure 51:
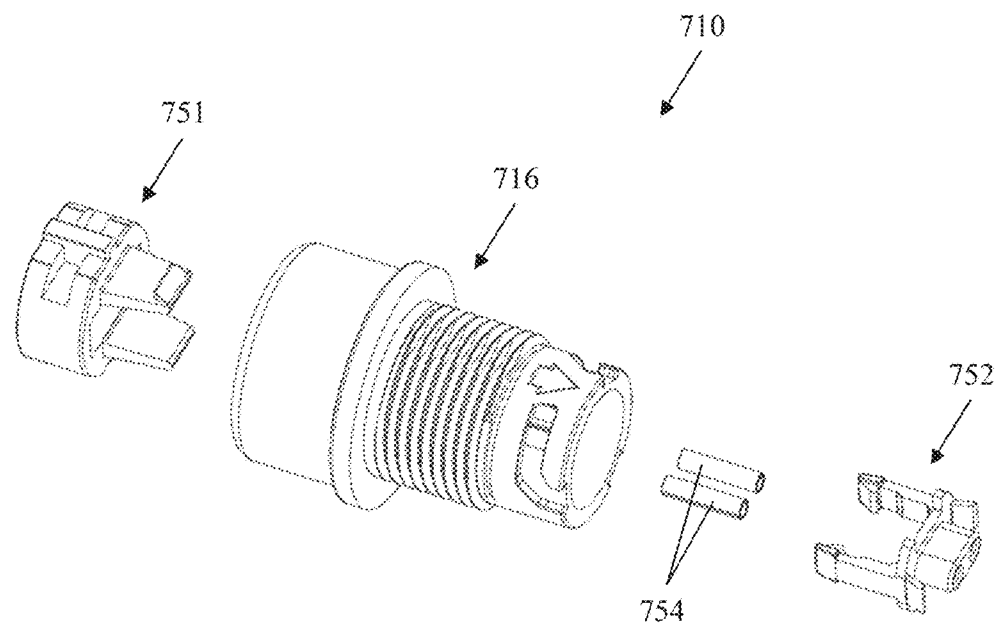
FIG. 51 is an exploded perspective thereof.
Figure 52:
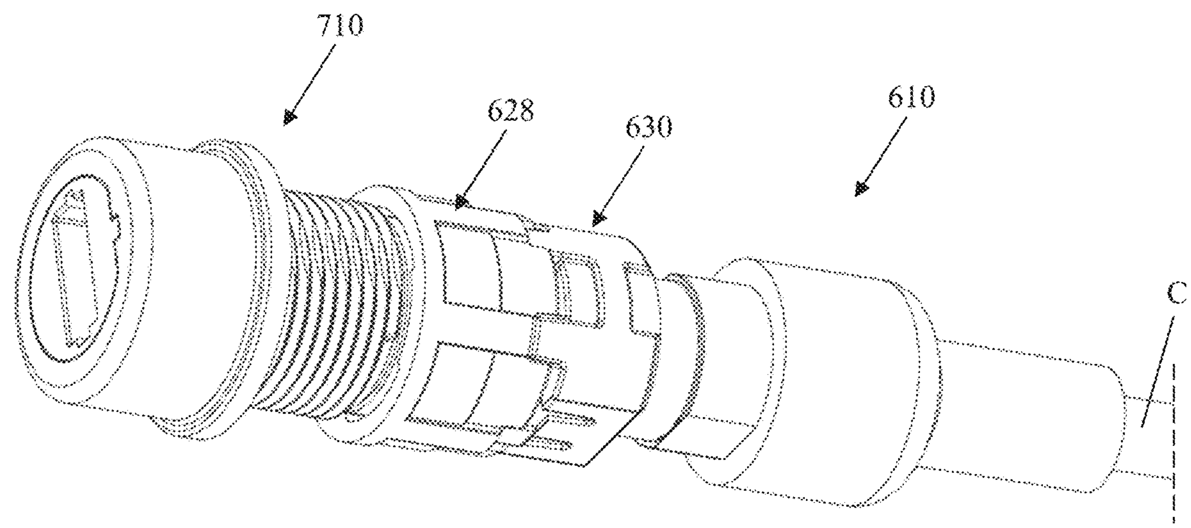
FIG. 52 is a perspective of the fiber optic connector of FIG. 42 attached to the adapter of FIG. 48.
Figure 53:
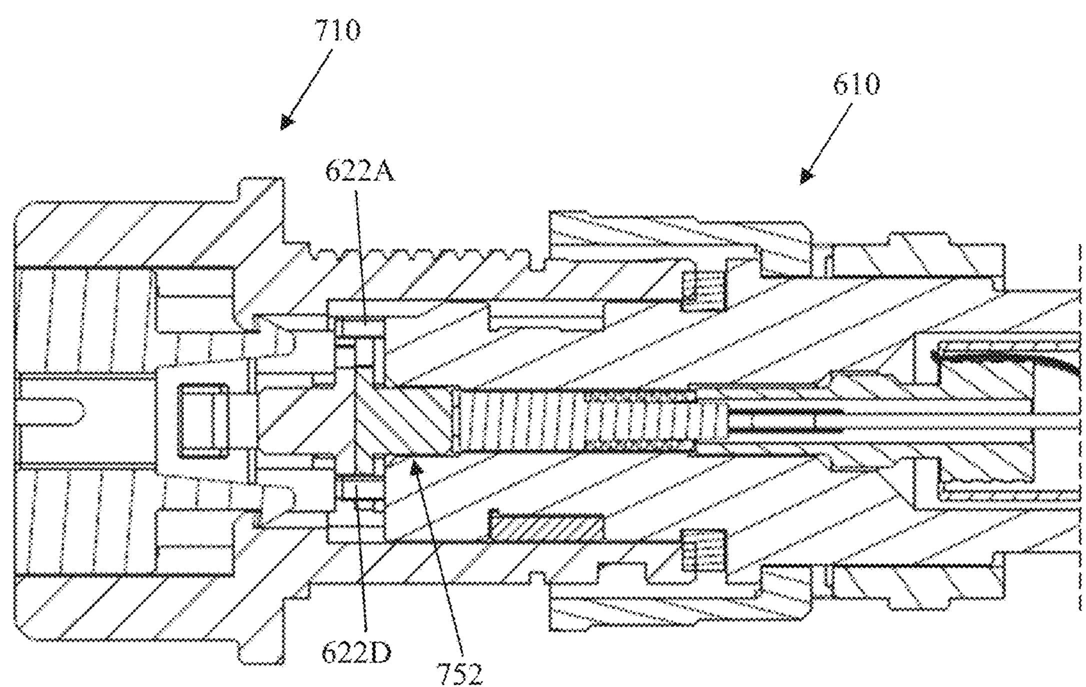
FIG. 53 is a vertical section thereof.
Figure 54:
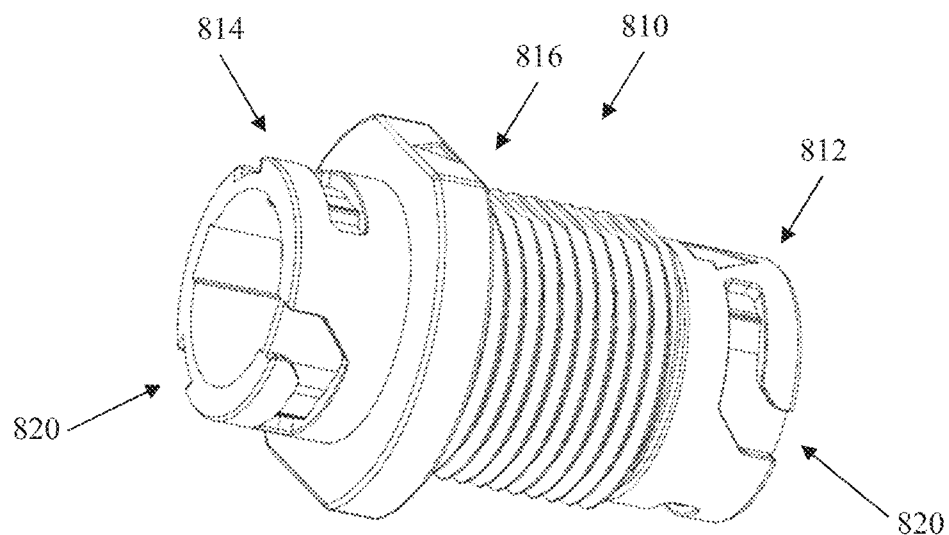
FIG. 54 is a side perspective of an adapter according to another embodiment of the present disclosure for coupling two fiber optic connectors of FIG. 42.
Figure 55:
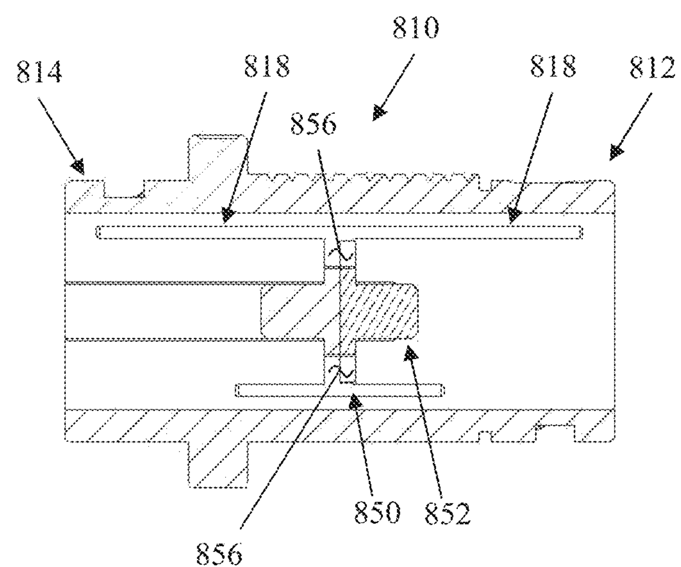
FIG. 55 is a vertical, longitudinal section thereof.
Figure 56:
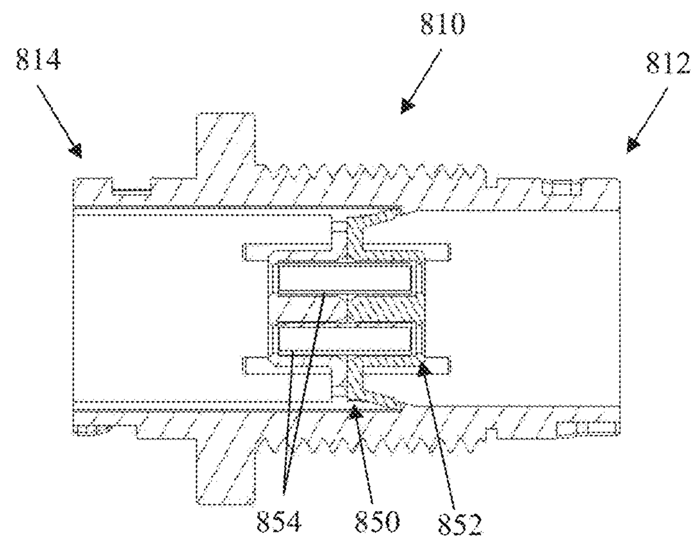
FIG. 56 is a horizontal, longitudinal section thereof.
Figure 57:
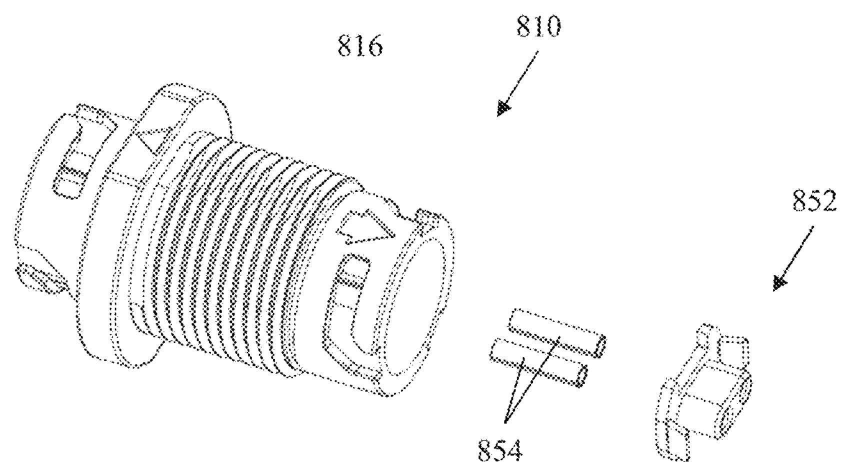
FIG. 57 is an exploded view thereof.
Figure 58:
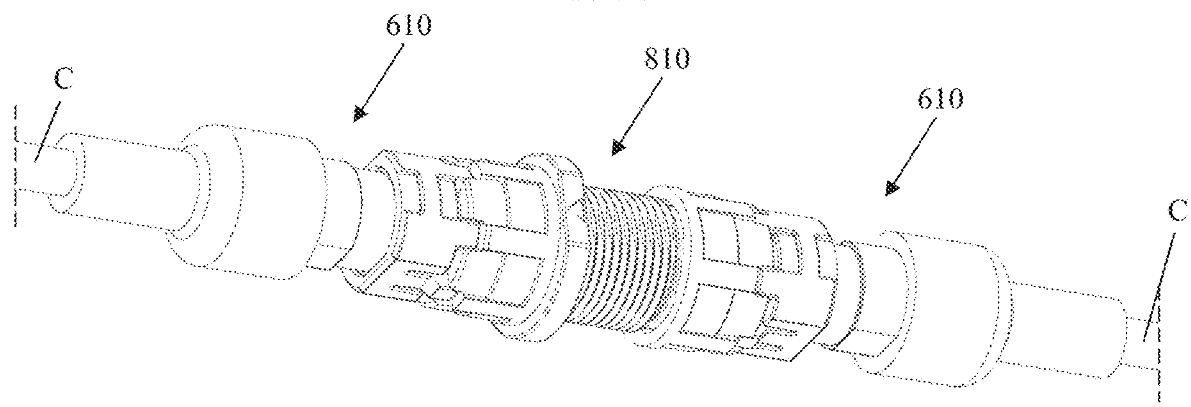
FIG. 58 is a perspective of two fiber optic connectors of FIG. 42 attached to the adapter of FIG. 54.
Figure 59:
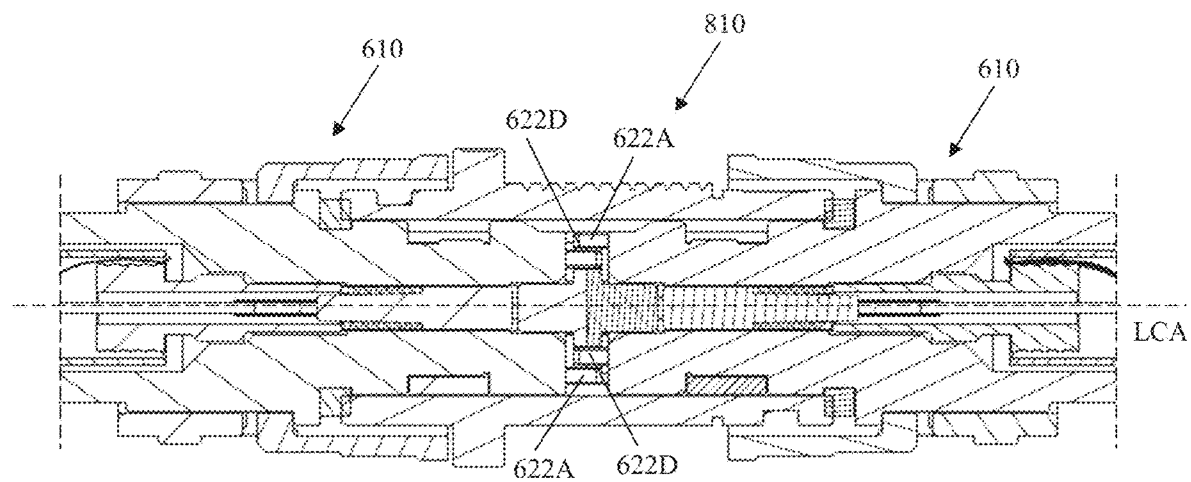
FIG. 59 is a vertical section thereof.
Figure 60:
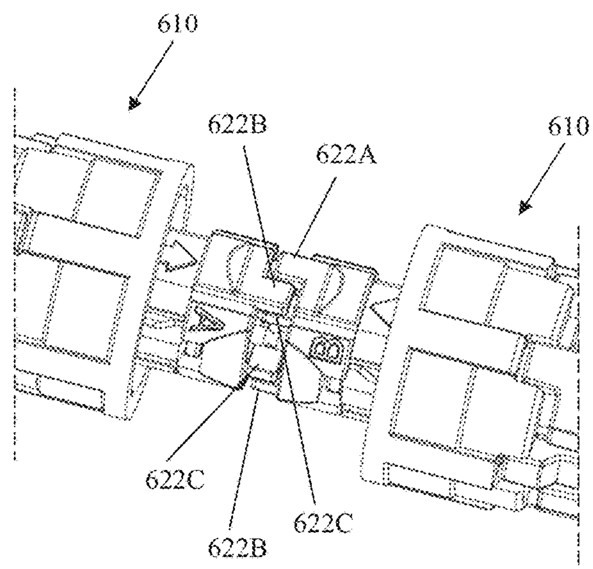
FIG. 60 is a fragmentary perspective similar to FIG. 58 from a vantage to the side and above, with the adapter hidden from view to reveal interior details.
Figure 61:
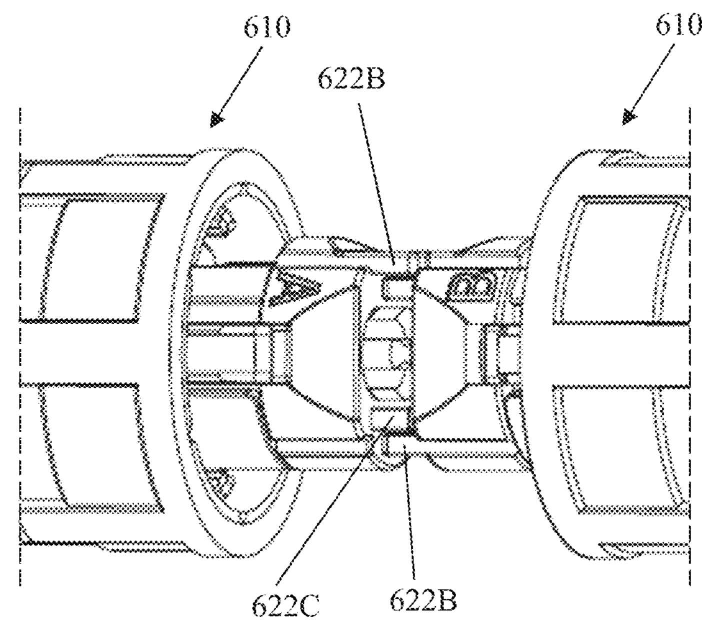
FIG. 61 is a perspective similar to FIG. 60 from a vantage to the side.
Figure 62:
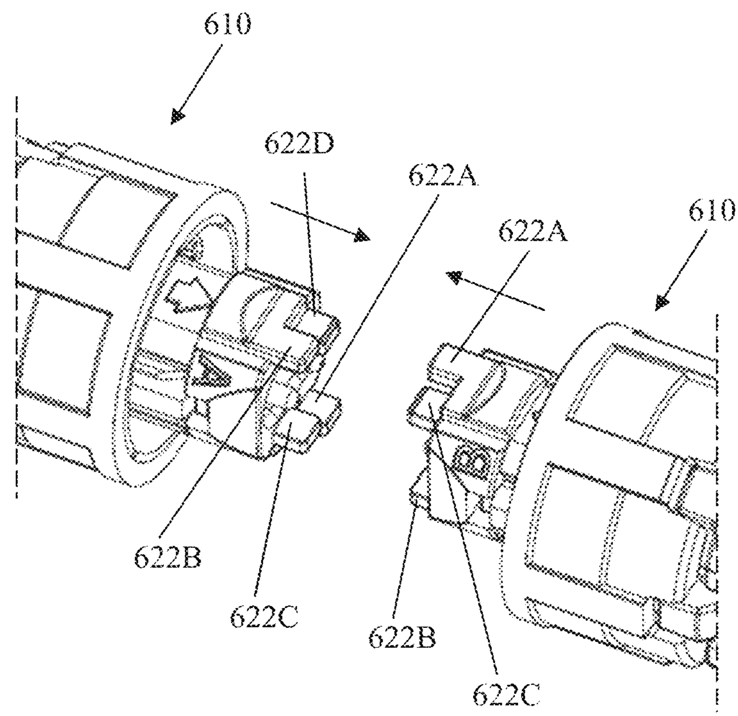
FIG. 62 is a fragmentary perspective from a vantage to the side and above of two fiber optic connectors of FIG. 42 aligned for mating engagement with each other.
Figure 63:
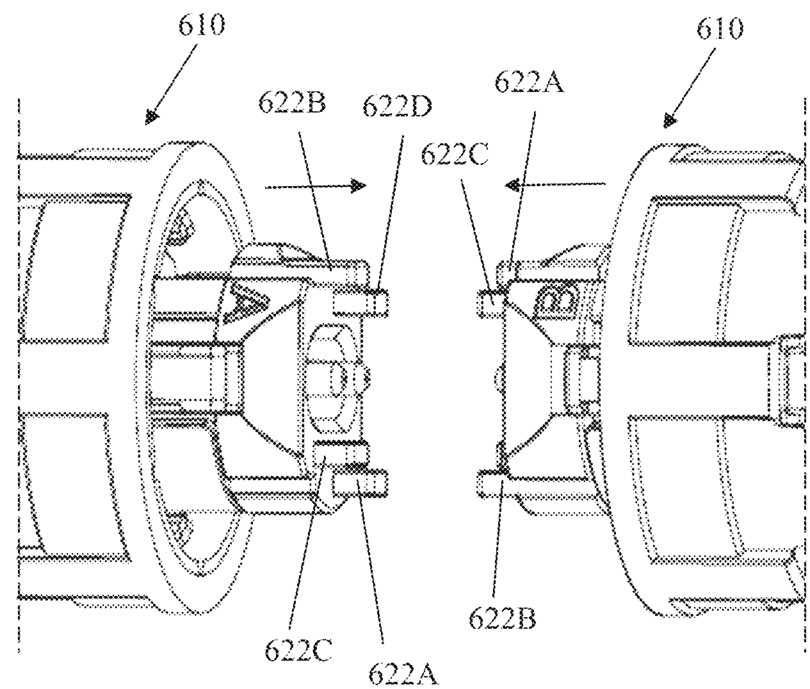
FIG. 63 is a perspective similar to FIG. 62 from a vantage to the side.

Referring to FIGS. 46 and 47, in this embodiment, the fiber optic connector 610 includes a polarity key 660. The polarity key 660 sets the polarity of the fiber optic connector 610, such that the connector is a reversible polarity fiber optic connector that enables the polarity of the fiber optic connector to be changed. As generally known in the art, polarity refers to the orientation of the two ferrules 612 of the fiber optic connector 610 relative to the fiber optic device, such as the other fiber optic connector (and by an extension an adapter 710). The polarity key 660 is configured to be coupled to the outer housing 614 at one of a first polarity position or a second polarity position. The polarity key 660 allows the fiber optic connector 610 to be attached to the adapter 710 in only one orientation. The polarity key 660 prevents the fiber optic connector 610 from being coupled to the fiber optic adapter 710 in the second polarity orientation when the polarity key is in the first polarity position. Similarly, the polarity key 660 prevents the fiber optic connector 610 from being coupled to the fiber optic adapter 710 in the first polarity orientation when the polarity key is in the second polarity position.

When attached to the outer housing 614, the polarity key 660 blocks one set of the alignment keys 626 (e.g., channels), thereby inhibiting these alignment keys from fully receiving the alignments guides 718 of the adapter and preventing the fiber optic connector 610 from being attached to the adapter in such an orientation. In other words, the only way to insert the fiber optic connector 610 in the adapter 710 is to align the alignment guides 718 with the unblocked alignment keys 626. The polarity key 660 is releasably connected to the outer housing 614, so that a user can selective choose which alignment keys 626 to block, thereby setting the polarity of the fiber optic connector 610. In the illustrated embodiment, the polarity key 660 is releasably snap-fit to the outer housing 616. To change the polarity of the fiber optic connector 610, the user removes the polarity key 660 from the outer housing 614 (e.g., the first polarity position), rotates the outer hosing 180 degrees about the longitudinal centerline axis LCA and then reattaches the polarity key 660 (in the second polarity position) to block the other set of alignment keys 626. The outer housing 614 may include indicia (e.g., letters such as "A" and "B") to help identify the polarity orientation of the fiber optic connector 610.

Referring to FIGS. 54-63, another embodiment of an adapter (e.g., an LC adapter) according to the present disclosure is generally indicated by reference numeral 810. Adapter 810 is generally analogous to adapter 710 and, thus, for ease of comprehension, where similar, analogous or identical parts are used, reference numerals "100" units higher are employed. Accordingly, unless clearly stated or indicated otherwise, the above descriptions regarding adapter 710 also apply to adapter 810.

In this embodiment, the adapter 810 is for connecting to two fiber optic connectors 610 of FIGS. 42-47 to each other. The second port 814 is generally identical to the first port 812 (e.g., is configured to receive the fiber optic connector 610). In particular, some of the features (e.g., alignment guides 818) of the second port 814 may be a mirror image of the corresponding features of the first port 814. As shown in FIGS. 59-63, when first and second fiber optic connectors 610 are attached to the adapter 810, the first protector 622A of each fiber optic connector 610 is disposed in the respective second protector pocket 624B of the other fiber optic connector. Likewise, the second protector 622B of each fiber optic connector 610 is disposed in the respective first protector pocket 624A of the other fiber optic connector. Likewise, the third protector 622C of each fiber optic connector 610 is disposed in the respective fourth protector pocket 624D of the other fiber optic connector. Likewise, the fourth protector 622D of each fiber optic connector 610 is disposed in the respective third protector pocket 624C of the other fiber optic connector. The first, second, third, and fourth protectors 622A, 622B, 622C, 622D also extend into their corresponding windows 856 of the adapter 810. Thus, the fiber optic connectors 610 form a mating connection with each other within the adapter 810. This mating connection mechanically strengthens the connection between the two fiber optic connectors 810.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fiber optic connector comprising:

a ferrule configured to form an optical connection with another fiber optic connector; and an outer housing supporting the ferrule, the outer housing having a rear end portion, a front end portion and a longitudinal centerline axis extend between the rear end portion and the front end portion, the front end portion including a front end face, at least a portion of the ferrule being forward of the front end face, the front end portion including one or more protectors projecting forward of the front end face of the outer housing, the one or more protectors being shaped and arranged to protect the portion of the ferrule that is forward of the front end face of the outer housing, the one or more protectors being configured so that the fiber optic connector and another fiber optic connector of identical construction can, starting in the same orientation, be mated together to form the optical connection by rotating said other fiber optic connector 180° about an axis perpendicular to the longitudinal centerline axis, aligning the longitudinal centerline axes of the fiber optic connectors after said rotating, and moving the fiber optic connectors along the longitudinal centerline axes after said aligning until the fiber optic connectors are mated to form the optical connection;

wherein the one or more protectors include a first protector and a second protector, the first protector being arranged asymmetrically with respect to the second protector about a plane including the longitudinal centerline axis of the outer housing that does not intersect either of the first or second protectors;

wherein the first protector is offset a first distance from the longitudinal centerline axis and the second protector is offset a second distance from the longitudinal centerline axis, the second distance being different than the first distance.

2. The fiber optic connector of claim 1, wherein the first and second protectors are offset in an x-direction and a y-direction from each other.

3. The fiber optic connector of claim 1, wherein the one or more protectors include a third protector and a fourth protector, the third and fourth protectors being offset in an x-direction and a y-direction from each other and being offset the same distance from the longitudinal centerline axis.

4. The fiber optic connector of claim 1, wherein each of the one or more protectors comprises a wall.

5. The fiber optic connector of claim 1, wherein the front end portion of the outer housing defines one or more protector pockets configured to receive one or more protectors of said other fiber optic connector.

6. The fiber optic connector of claim 5, wherein each protector pocket is sized, shaped and arranged to receive one of the one or more protectors of said other fiber optic connector.

7. The fiber optic connector of claim 6, wherein the one or more protector pockets are forward of the front end face.

8. The fiber optic connector of claim 6, wherein the one or more protector pockets are rearward of the front end face.

9. The fiber optic connector of claim 6, wherein each protector pocket comprises a recess.

10. The fiber optic connector of claim 1, wherein the ferrule is one of an MPO ferrule, an SC ferrule, or a LC ferrule.

11. The fiber optic connector of claim 1, further comprising a coupling element configured to secure the fiber optic connector to a fiber optic adapter.

12. The fiber optic connector of claim 11, wherein the coupling element comprises a coupling nut.

13. The fiber optic connector of claim 12, wherein the coupling nut is a bayonet style coupling nut.

14. The fiber optic connector of claim 1, in combination with a fiber optic adapter, the fiber optic adapter having a first port configured to receive the fiber optic connector and a second port opposite the first port configured to receive another fiber optic connector of different construction, the first and second ports arranged such that the fiber optic connector and said fiber optic connector of different construction form an optical connection when coupled to the fiber optic adapter.

15. The fiber optic connector of claim 1, in combination with a fiber optic adapter, the fiber optic adapter having a first port configured to receive the fiber optic connector and a second port opposite the first port configured to receive said fiber optic connector of identical construction, the first and second ports arranged such that the fiber optic connector and said fiber optic connector of identical construction form an optical connection when coupled to the fiber optic adapter.

16. The fiber optic connector of claim 15, wherein the fiber optic adapter includes an alignment guide configured to engage the outer housing of the fiber optic connector to orient the outer housing relative to the fiber optic adapter.

17. The fiber optic connector of claim 15, wherein the fiber optic connector further comprises a polarity key configured to be coupled to the outer housing at one of a first polarity position or a second polarity position, wherein the fiber optic connector is configured to be coupled to the fiber optic adapter in a first polarity orientation or a second polarity orientation, wherein the polarity key prevents the fiber optic connector from being coupled to the fiber optic adapter in the second polarity orientation when the polarity key is in the first polarity position and the polarity key prevents the fiber optic connector from being coupled to the fiber optic adapter in the first polarity orientation when the polarity key is in the second polarity position.

18. The fiber optic connector of claim 15, wherein the fiber optic adapter defines one or more windows size, shaped and arranged to receive one or more of the one or more protectors of the fiber optic connector when the fiber optic connector is coupled to the fiber optic adapter.

19. A fiber optic connector comprising:

a ferrule configured to form an optical connection with another fiber optic connector; and an outer housing supporting the ferrule, the outer housing having a rear end portion, a front end portion and a longitudinal centerline axis extend between the rear end portion and the front end portion, the front end portion including a front end face, at least a portion of the ferrule being forward of the front end face, the front end portion including one or more protectors projecting forward of the front end face of the outer housing, the one or more protectors being shaped and arranged to protect the portion of the ferrule that is forward of the front end face of the outer housing, the one or more protectors being configured so that the fiber optic connector and another fiber optic connector of identical construction can, starting in the same orientation, be mated together to form the optical connection by rotating said other fiber optic connector 180° about an axis perpendicular to the longitudinal centerline axis, aligning the longitudinal centerline axes of the fiber optic connectors after said rotating, and moving the fiber optic connectors along the longitudinal centerline axes after said aligning until the fiber optic connectors are mated to form the optical connection;

wherein the one or more protectors include a first protector and a second protector, the first protecting being arranged asymmetrically with respect to the second protector about a plane including the longitudinal centerline axis of the outer housing that does not intersect either of the first or second protectors;

wherein the one or more protectors include a third protector and a fourth protector, the third and fourth protectors being offset in an x-direction and a y-direction from each other and being offset the same distance from the longitudinal centerline axis.

20. A fiber optic assembly comprising:

a fiber optic connector including:

a ferrule configured to form an optical connection with another fiber optic connector; and an outer housing supporting the ferrule, the outer housing having a rear end portion, a front end portion and a longitudinal centerline axis extend between the rear end portion and the front end portion, the front end portion including a front end face, at least a portion of the ferrule being forward of the front end face, the front end portion including one or more protectors projecting forward of the front end face of the outer housing, the one or more protectors being shaped and arranged to protect the portion of the ferrule that is forward of the front end face of the outer housing, the one or more protectors being configured so that the fiber optic connector and another fiber optic connector of identical construction can, starting in the same orientation, be mated together to form the optical connection by rotating said other fiber optic connector 180° about an axis perpendicular to the longitudinal centerline axis, aligning the longitudinal centerline axes of the fiber optic connectors after said rotating, and moving the fiber optic connectors along the longitudinal centerline axes after said aligning until the fiber optic connectors are mated to form the optical connection; and a fiber optic adapter having a first port configured to receive the fiber optic connector and a second port opposite the first port configured to receive said fiber optic connector of identical construction, the first and second ports arranged such that the fiber optic connector and said fiber optic connector of identical construction form an optical connection when coupled to the fiber optic adapter;

wherein the fiber optic connector further comprises a polarity key configured to be coupled to the outer housing at one of a first polarity position or a second polarity position, wherein the fiber optic connector is configured to be coupled to the fiber optic adapter in a first polarity orientation or a second polarity orientation, wherein the polarity key prevents the fiber optic connector from being coupled to the fiber optic adapter in the second polarity orientation when the polarity key is in the first polarity position and the polarity key prevents the fiber optic connector from being coupled to the fiber optic adapter in the first polarity orientation when the polarity key is in the second polarity position.

* * * * *